US012634931B2

(12) United States Patent
Matsumura et al.

(10) Patent No.: US 12,634,931 B2
(45) Date of Patent: May 19, 2026

(54) TERMINAL AND RADIO COMMUNICATION METHOD

(71) Applicant: NTT DOCOMO, INC., Tokyo (JP)

(72) Inventors: Yuki Matsumura, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 1028 days.

(21) Appl. No.: 17/780,842

(22) PCT Filed: Nov. 28, 2019

(86) PCT No.: PCT/JP2019/046665
§ 371 (c)(1),
(2) Date: Oct. 20, 2022

(87) PCT Pub. No.: WO2021/106169
PCT Pub. Date: Jun. 3, 2021

(65) Prior Publication Data
US 2025/0344209 A1    Nov. 6, 2025

(51) Int. Cl.
| | |
|---|---|
| *H04W 72/23* | (2023.01) |
| *H04B 7/06* | (2006.01) |
| *H04L 5/00* | (2006.01) |
| *H04W 72/0446* | (2023.01) |
| *H04W 72/1273* | (2023.01) |
| *H04W 72/231* | (2023.01) |

(Continued)

(52) U.S. Cl.
CPC .... *H04W 72/1273* (2013.01); *H04B 7/06968* (2023.05); *H04W 72/0446* (2013.01); *H04W 72/231* (2023.01); *H04W 72/51* (2023.01); *H04W 76/20* (2018.02)

(58) Field of Classification Search
CPC .............. H04L 5/0044; H04W 72/232; H04B 7/06968; H04B 7/08; H04B 7/06; H04B 7/088
See application file for complete search history.

(56) References Cited

U.S. PATENT DOCUMENTS

| | | |
|---|---|---|
| 2019/0342907 A1 | 11/2019 | Huang et al. |
| 2020/0008231 A1* | 1/2020 | Vilaipornsawai ..... H04W 72/21 |

(Continued)

FOREIGN PATENT DOCUMENTS

| | | |
|---|---|---|
| EP | 3 565 172 A1 | 11/2019 |
| WO | 2019/153347 A1 | 8/2019 |

OTHER PUBLICATIONS

International Search Report issued in PCT/JP2019/046665 on Jun. 23, 2020 (2 pages).

(Continued)

*Primary Examiner* — Romani Ohri
(74) *Attorney, Agent, or Firm* — Osha Bergman Watanabe & Burton LLP

(57) ABSTRACT

A terminal according to one aspect of the present disclosure has a receiving section that receives one Downlink Control Information (DCI) for scheduling two Physical Downlink Shared Channels (PDSCHs), and a control section that maps two TCI state IDs associated with a certain codepoint to the two PDSCHs respectively, when the certain a codepoint of Transmission Configuration Indication (TCI) field is used in reception of the two PDSCHs. According to one aspect of the disclosure, it is possible to properly determine QCL parameters for multi-panel/TRP.

9 Claims, 16 Drawing Sheets

(51) Int. Cl.
    *H04W 72/51*     (2023.01)
    *H04W 76/20*     (2018.01)

(56)          References Cited

U.S. PATENT DOCUMENTS

| | | | |
|---|---|---|---|
| 2020/0221485 A1* | 7/2020 | Cirik | H04W 80/02 |
| 2020/0229161 A1* | 7/2020 | Raghavan | H04W 24/10 |
| 2020/0337058 A1* | 10/2020 | Song | H04L 5/0053 |
| 2021/0105805 A1* | 4/2021 | Venugopal | H04L 5/0053 |
| 2022/0295494 A1 | 9/2022 | Song et al. | |
| 2024/0259078 A1* | 8/2024 | Gao | H04W 16/28 |

OTHER PUBLICATIONS

Written Opinion of the International Searching Authority issued in PCT/JP2019/046665 on Jun. 23, 2020 (4 pages).

LG Electronics; "Enhancements on multi-TRP/panel transmission"; 3GPP TSG RAN WG1 Meeting #99, R1-1912269; Reno, USA; Nov. 18-22, 2019 (16 pages).

Huawei, HiSilicon; "MAC CE signalling enhancement for TCI indication of single-PDCCH based multi-TRP transmission"; 3GPP TSG-RAN WG2 Meeting #108, R2-1914674; Reno, USA; Nov. 18-22, 2019 (5 pages).

Huawei, HiSilicon; "Summary of Proposals for M-TRP Offline Session on Thursday"; 3GPP TSG RAN WG1 Meeting #99, R1-1913518; Reno, USA; Nov. 18-22, 2019 (2 pages).

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

NTT DOCOMO; "Enhancements on multi-TRP/panel tranmission"; 3GPP TSG RAN WG1 #99, R1-1912893; Reno, USA; Nov. 18-22, 2019 (21 pages).

Extended European Search Report issued in counterpart European Application No. 19954410.7 mailed on Jul. 3, 2023 (9 pages).

Office Action issued in Chinese Patent Application No. 201980103523. X, dated Nov. 30, 2024 (12 pages).

Office Action issued in Canadian Patent Application No. 3,162,123, dated Dec. 31, 2024 (4 pages).

Office Action issued in Japanese Patent Application No. 2021-561087, mailed on Jan. 9, 2024 (5 pages).

Office Action issued in the counterpart Japanese Patent Application No. 2021-561087, mailed on Sep. 5, 2023 (6 pages).

\* cited by examiner

SCHEME 1a

SCHEME 2a

SCHEME 2a

SCHEME 2b

SCHEME 2b

SCHEME 3

TRANSMISSION OCCASION #1, TCI#1, RV#0

TRANSMISSION OCCASION #2, TCI#2, RV#3

TIME

SCHEME 4

TRANSMISSION OCCASION #1, TCI#1, RV#0

TRANSMISSION OCCASION #2, TCI#2, RV#3

TIME

FIG. 8B

| TCI CODEPOINT | TCI STATE |
|---|---|
| 000 | T2 |
| 001 | T0 & T1 |
| 010 | T5 |
| 011 | T8 |
| 100 | T10 & T11 |
| 101 | T14 |
| 110 | T16 |
| 111 | T22 & T23 |

| TCI CODEPOINT | TCI STATE ID | |
|---|---|---|
| 000 | 2 | |
| 001 | 1 | 0 |
| 010 | 5 | |
| 011 | 8 | |
| 100 | 10 | 11 |
| 101 | 14 | |
| 110 | 16 | |
| 111 | 22 | 23 |

FIG. 9A

| TCI CODEPOINT | TCI STATE ID | |
|---|---|---|
| 000 | 2 | |
| 001 | 0 | 1 |
| 010 | 5 | |
| 011 | 8 | |
| 100 | 10 | 11 |
| 101 | 14 | |
| 110 | 16 | |
| 111 | 22 | 23 |

SCHEME 1a

SCHEME 2a OR 2b

SCHEME 2a OR 2b

SCHEME 3

TRANSMISSION OCCASION #1, TCI#0

TRANSMISSION OCCASION #2, TCI#1

TIME

SCHEME 4

TRANSMISSION OCCASION #1, TCI#0

TRANSMISSION OCCASION #2, TCI#1

TIME

TERMINAL AND RADIO COMMUNICATION METHOD

TECHNICAL FIELD

The present disclosure relates to a terminal and radio communication method in the next-generation mobile communication system.

BACKGROUND ART

In Universal Mobile Telecommunications System (UMTS) networks, for the purpose of higher data rates, low delay and the like, Long Term Evolution (LTE) has been specified (Non-patent Document 1). Further, for the purpose of higher capacity, more sophistication and the like than LTE (Third Generation Partnership Project (3GPP) Release (Rel.) 8, 9), LTE-Advanced (3GPP Rel. 10-14) has been specified.

Successor systems (e.g., also referred to as 5th generation mobile communication system (5G), 5G+ (plus), New Radio (NR), 3GPP Rel.15 onward, etc.) to LTE have also been studied.

PRIOR ART DOCUMENT

Non-Patent Document

[Non-patent Document 1] 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April 2010

DISCLOSURE OF INVENTION

Problems to be Solved by the Invention

In future radio communication systems (e.g., NR), it is studied that a user terminal (User Equipment (UE)) controls transmission/reception processing, based on information about Quasi-Co-Location (QCL).

Further, in NR, it is studied that one or a plurality of transmission/reception points (Transmission/Reception Point (TRP)) (multi-TRP) performs DL transmission (e.g., PDSCH transmission) to a UE, using one or a plurality of panels (multi-panel).

However, in previous NR specifications, since multi-panel/TRP is not considered, it is not possible to properly determine QCL parameters in the case of using multi-panel/TRP. Unless the QCL parameter is properly determined, there is the risk that system performance degrades such as decreases in throughput.

Therefore, it is an object of the present disclosure to provide a terminal and radio communication method for properly determining QCL parameters for multi-panel/TRP.

Means for Solving the Problem

A terminal according to one aspect of the present disclosure has a receiving section that receives one Downlink Control Information (DCI) for scheduling two Physical Downlink Shared Channels (PDSCHs), and a control section that maps two TCI state IDs associated with a certain codepoint to the two PDSCHs respectively, when the certain codepoint of a Transmission Configuration Indication (TCI) field is used in reception of the two PDSCHs.

Advantageous Effect of the Invention

According to one aspect of the present disclosure, it is possible to properly determine QCL parameters for multi-panel/TRP.

BRIEF DESCRIPTION OF DRAWINGS

FIGS. 8A and 8B are diagrams showing one example of a method of determining QCL parameters of multiple PDSCH;

FIGS. 9A and 9B are diagrams showing one example of association of TCI codepoint with TCI state ID;

FIG. 10 is a diagram showing one example of mapping of two TCI states in scheme 1a;

BEST MODE FOR CARRYING OUT THE INVENTION (TCI, QCL)

Figure 1:
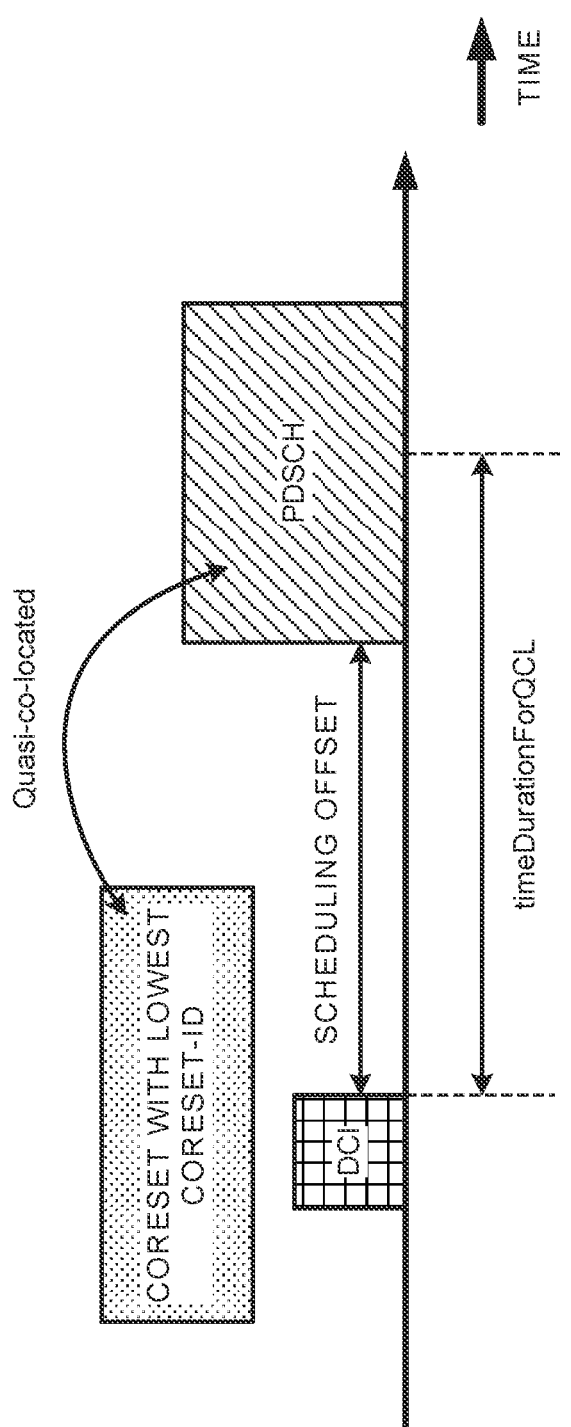
FIG. 1 is a diagram showing one example of QCL assumption of DMRS port of PDSCH.

In NR, it is studied to control reception processing (e.g., at least one of reception, demapping, demodulation and decoding) and transmission processing (e.g., at least one of transmission, mapping, precoding, modulation and coding) of at least one of a signal and a channel (expressed as signal/channel) in a UE, based on a Transmission Configuration Indication state (TCI state).

The TCI state may express information applied to a downlink signal/channel. Information corresponding to the TCI state applied to an uplink signal/channel may be expressed as spatial relation.

The TCI state is information about Quasi-Co-Location (QCL) of the signal/channel, and may be called a spatial reception parameter, spatial relation information (SRI) and the like. The TCI state may be configured on a UE for each channel or for each signal.

The QCL is an indicator indicative of statistical properties of the signal/channel. For example, in the case where some signal/channel and another signal/channel are in a QCL relationship, in between these different signals/channels, the case may mean that it is possible to assume that at least one of Doppler shift, Doppler spread, average delay, delay spread, and spatial parameter (e.g., spatial reception parameter (spatial Rx parameter)) is the same (with respect to at least one of these types of information, QCL holds).

In addition, the spatial Rx parameter may correspond to a reception beam (e.g., reception analog beam) of the UE, or a beam may be identified based on spatial QCL. The QCL (or at least one element of QCL) in the present disclosure may be read with sQCL (spatial QCL).

With respect to QCL, a plurality of types (QCL types) may be defined. For example, 4 QCL types A-D may be configured where parameters (or parameter sets) assumed to be the same are different, and the parameters (which may be called QCL parameters) will be described below:

QCL-Type-A (QCL-A): Doppler shift, Doppler spread, average delay and delay spread;

QCL-Type-B (QCL-B): Doppler shift and Doppler spread;

QCL-Type-C (QCL-C): Doppler shift and average delay; and

QCL-Type-D (QCL-D): Spatial reception parameter.

It may be called QCL assumption that a UE assumes that some control resource set (Control Resource Set (CORESET)), channel or reference signal is in a certain QCL (e.g., QCL-Type-D) relationship with another CORESET, channel or reference signal.

Based on the TCI state or QCL assumption of a signal/channel, the UE may determine at least one of a transmission beam (Tx beam) and a reception beam (Rx beam) of the signal/channel.

For example, the TCI state may be information about QCL between a target channel (in other words, reference signal (RS) for the channel) and another signal (e.g., another RS). The TCI state may be configured (indicated) by higher layer signaling, physical layer signaling, or a combination thereof.

In the present disclosure, for example, the higher layer signaling may be one of Radio Resource Control (RRC) signaling, Medium Access Control (MAC) signaling, broadcast information and the like, or a combination thereof.

For example, the MAC signaling may use MAC Control Element (MAC CE), MAC Protocol Unit (PDU) and the like. For example, the broadcast information may be Master Information Block (MIB), System Information Block (SIB), Remaining Minimum System Information (RMSI), Other System Information (OSI) and the like.

For example, the physical layer signaling may be Downlink Control Information (DCI).

For example, a channel configured (designated) for the TCI state or spatial relation may be at least one of a downlink shared channel (Physical Downlink Shared Channel (PDSCH)), downlink control channel (Physical Downlink Control Channel (PDCCH)), uplink shared channel (Physical Uplink Shared Channel (PUSCH)), and uplink control channel (Physical Uplink Control Channel (PUCCH)).

Further, for example, an RS to be the QCL relationship with the channel may be at least one of Synchronization Signal Block (SSB), Channel State Information Reference Signal (CSI-RS), Sounding Reference Signal (SRS), Tracking CSI-RS (also called Tracking Reference Signal (TRS)), and QCL Detection Reference Signal (also called QRS).

The SSB is a signal block including at least one of Primary Synchronization Signal (PSS), Secondary Synchronization Signal (SSS), and broadcast channel (Physical Broadcast Channel (PBCH)). The SSB may be called an SS/PBCH block.

The UE may receive configuration information (e.g., PDSCH-Config, tci-StatesToAddModList) including a list of information elements of the TCI state.

An information element ("TCI-state IE" of RRC) of the TCI state configured by the higher layer signaling may include a TCI state ID and one or a plurality of pieces of QCL information ("QCL-Info"). The QCL information may include at least one of information (RS relation n information) about the RS to be the QCL relationship and information (QCL type information) indicative of the QCL type. The RS relation information may include information on an index of the RS (e.g., SSB index, Non-Zero-Power-CSI-RS (Non-Zero-Power (NZP) CSI-RS) resource ID (Identifier)), an index of a cell in which the RS is positioned, an index of a Bandwidth Part (BWP) in which the RS is positioned and the like.

In Rel. 15 NR, as the TCI state of at least one of the PDCCH and PDSCH, the UE is capable of being configured for both of the RS of QCL-Type-A and the RS of QCL-Type-D, or only the RS of QCL-Type-A.

In the case of configuring the TRS as the RS of QCL-Type-A, as distinct from a demodulation reference signal (DeModulation Reference Signal (DMRS)) for the PDCCH or PDSCH, it is assumed that the same TRS is transmitted periodically for a long time. The UE measures the TRS, and is capable of calculating the average delay, delay spread the like.

In the TCI state of the DMRS of the PDCCH or PDSCH, as the RS of QCL-Type-A, the UE configured for the TRS is capable of assuming that the DMRS of the PDCCH or PDSCH is the same as the parameter (average delay, delay spread, etc.) of QCL-Type-A of the TRS, and therefore, from a measurement result of the TRS, is capable of obtaining the parameter (average delay, delay spread, etc.) of the Type-A of the DMRS of the PDCCH or PDSCH. In performing channel estimation of at least one of the PDCCH and PDSCH, using the measurement result of the TRS, the UE is capable of performing channel estimation with higher accuracy.

The UE configured for the RS of QCL-Type-D is capable of determining a UE reception beam (spatial domain reception filter, UE spatial domain reception filter), using the RS of QCL-Type-D.

The RS of QCL-Type-X of the TCI state may mean an RS in QCL-Type-X relationship with (DMRS of) some channel/signal. The RS may be called a QCL source of the QCL-Type-X of the TCI state.

<TCI State for PDCCH>

Information on QCL between the PDCCH (or DMRS antenna port related to the PDCCH) and some RS may be called the TCI state for the PDCCH and the like.

The UE may determine the TCI state for a UE-specific PDCCH (CORESET), based on higher layer signaling. For example, the UE may be configured for one or a plurality of (K) TCI states for each CORESET by RRC signaling.

In the UE, for each CORESET, one of a plurality of TCI states configured by the RRC signaling may be activated by MAC CE. The MAC CE may be called TCI State Indication for UE-specific PDCCH MAC CE. The UE may perform monitoring of a CORESET, based on an active TCI state that corresponds to the CORESET.

<TCI State for PDSCH>

Information on QCL between the PDSCH (or DMRS antenna port related to the PDSCH) and some DL-RS may be called the TCI state for the PDSCH and the like.

The UE may be notified of (configured for) M (M≥1) TCI states (QCL information for M PDSCHs) for the PDSCH by the higher layer signaling. In addition, the number M of TCI states configured on the UE may be limited by at least one of UE capability and the QCL type.

The DCI used in scheduling of a PDSCH may include a field (e.g., which may be called a TCI field, TCI state field, etc.) indicative of the TCI state for the PDSCH. The DCI may be used in scheduling of PDSCHs of one cell, and for example, may be called DL DCI, DL assignment, DCI format 1_0, DCI format 1_1 and the like.

Whether or not the TCI field is included in the DCI may be controlled by information notified from the base station to the UE. The information may be information (e.g., TCI Field-Present information, TCI-Present In DCI information, hither layer parameter TCI-PresentInDCI) indicating whether or not the TCI field is present (present or absent) in the DCI. For example, the information may be configured on the UE by the higher layer signaling.

In the case where TCI states exceeding 8 types are configured on the UE, using the MAC CE, TCI states of 8 types or less may be activated (designated). The MAC CE may be called TCI States Activation/Deactivation for UE-specific PDSCH MAC CE. A value of the TCI field in the DCI may indicate one of TCI states activated by the MAC CE.

In the case where the UE is configured for the TCI Field-Present information set to be "enabled" with respect to the CORESET (CORESET used in PDCCH transmission to schedule the PDSCH) for scheduling the PDSCH, the UE may assume that the TCI field is present in DCI format 1_1 of the PDCCH transmitted on the CORESET.

In the Case where the TCI Field-Present information is not configured for the CORESET for scheduling a PDSCH or the PDSCH is scheduled by DCI format 1_0, when a time offset is a threshold or more between reception of DL DCI (DCI for scheduling the PDSCH) and reception of the PDSCH corresponding to the DCI, in order to determine QCL of the PDSCH antenna port, the UE may assume that the TCI state or QCL assumption for the PDSCH is the same as the TCI state or QCL assumption applied to the CORE-SET used in PDCCH transmission for scheduling the PDSCH.

In the case where the TCI Field-Present information is set as "enabled", when the TCI field within the DCI in a component carrier (CC) to schedule (a PDSCH) indicates an activated TCI state in the scheduled CC or DL BWP, and the PDSCH is scheduled by DCI format 1_1, in order to determine QCL of the PDSCH antenna port, the UE may use the TCI according to a value of the TCI field in the detected PDCCH having the DCI. In the case where a time offset is a threshold or more between reception of DL DCI (to schedule the PDSCH) and the PDSCH (PDSCH scheduled by the DCI) corresponding to the DCI, the UE may assume that the DM-RS port of the PDSCH of the serving cell is QCL with an RS in the TCI state related to the QCL type parameter given by the indicated TCI state.

In the case where the UE is configured for a single slot PDSCH, the indicated TCI state may be based on an activated TCI state in the slot having the scheduled PDSCH. In the case where the UE is configured for a plurality of slot PDSCHs, the indicated TCI state may be based on an activated TCI state within a first slot having the scheduled PDSCH, or the UE may expect that the TCI state is the same over the slot having the scheduled PDSCH. In the case where the UE is configured for a CORESET associated with a search space set for cross-carrier scheduling, when the TCI-Field Present information is set as "enabled" for the CORESET, and at least one TCI state configured for the serving cell scheduled by the search space set includes QCL-Type-D, the UE may assume that a time offset between the detected PDCCH and the PDSCH corresponding to the PDCCH is a threshold or more.

In an RRC connection mode, in both the case where the TCI Information in DCI (higher layer parameter TCI-PresentInDCI) is set as "enabled" and the case where the TCI information in DCI is not configured, when a time offset between reception of DL DCI (DCI for scheduling a PDSCH) and the corresponding PDSCH (PDSCH scheduled by the DCI) is less than a threshold, the UE may assume that the DM-RS port of the PDSCH of the serving cell is QCL with an RS related to the QCL parameter used in QCL indication of the PDCCH of a CORESET associated with a monitored search space where one or more CORESETs in an active BWP of the serving cell have a lowest CORESET-ID in the latest slot monitored by the UE (FIG. 1). The RS may be called a default TCI state of the PDSCH or default QCL assumption of the PDSCH.

The time offset between reception of DL DCI and reception of the PDSCH corresponding to the DCI may be called a scheduling offset.

Further, the above-mentioned threshold may be called QCL time duration, "timeDurationForQCL", "Threshold", "Threshold for offset between a DCI indicating a TCI state and a PDSCH scheduled by the DCI", "Threshold-Sched-Offset", schedule offset threshold, scheduling offset threshold and the like.

The QCL time duration may be based on the UE capability, and for example, may be based on a delay taken for decoding of the PDCCH and beam switching. The QCL time duration may be a minimum time required for the UE to perform PDCCH reception and application of spatial QCL information received in DCI for PDSCH processing. The QCL time duration may be expressed by the number of symbols for each subcarrier spacing or may be expressed by time (e.g., μs). The information on the QCL time duration may be reported to the base station from the UE as the UE capability information, or may be configured on the UE from the base station using higher layer signaling.

For example, the UE may assume that the DMRS port of the above-mentioned PDSCH is QCL with DL-RS based on the activated TCI state for the CORESET that corresponds to the above-mentioned minimum CORESET-ID. For example, the latest slot may be a slot for receiving the DCI for scheduling the above-mentioned PDSCH.

In addition, the CORESET-ID may be an ID (ID to identify the CORESET, controlResourceSetId) configured by RRC information element "ControlResourceSet".

In the case where any CORESET is not configured for a CC, the default TCI state may be an activated TCI state having a lowest ID applicable to the PDSCH within the active DL BWP of the CC.

Subsequent to Rel. 16, in the case where a PDSCH and a PDCCH for scheduling the PDSCH are present in different component carriers (CCs) (cross-carrier scheduling), when a delay (PDCCH-to-PDSCH delay) from the PDCCH to the PDSCH is smaller than the QCL time duration, or when the TCI state does not exist in DCI for the scheduling, the UE may acquire QCL assumption for the PDSCH scheduled from an active TCI state having the lowest ID applicable to a PDSCH within an active BWP of the scheduled cell.

(Service (Traffic Type))

In future radio communication systems (e.g., NR) are expected more sophistication (e.g., enhanced Mobile Broadband (eMBB)) than the mobile broadband, machine type communication (e.g., massive Machine Type Communications (mMTC), Internet of Things (IoT)) for actualizing massive simultaneous connection, and traffic types (also referred to as a type, service, service type, communication type, use case, etc.) such as, for example, Ultra-Reliable and Low-Latency Communications (URLLC). For example, in URLLC is required smaller latency and higher reliability than eMBB.

The traffic type may be identified in the physical layer based on at least one of the following items.

Logical channels having different priorities

Modulation and Coding Scheme (MCS) table (MCS index table)

Channel Quality Indication (CQI) table

DCI format

Radio Network Temporary Identifier (RNTI) (e.g., System Information (SI)-RNTI) used in scrambling (mask) of Cyclic Redundancy Check (CRC) bits included in (added to) the DCI (DCI format)

RRC (Radio Resource Control) parameter

Certain RNTI (e.g., RNTI for URLLC, MCS-C-RNTI, etc.)

Search space.

Field (e.g., newly added field or reuse of the existing field) in DCI

The traffic type may be associated with communication requirements (requirements for delay, error rate, etc., request conditions), data type (voice, data, etc.).

A difference between requirements of URLLC and requirements of eMBB may be that latency of URLLC is smaller than latency of eMBB, or that the requirements of URLLC include requirements of reliability.

(Multi-TRP)

In NR, it is studied that one or a plurality of transmission/reception points (Transmission/Reception Point (TRP)) (multi-TRP) performs DL transmission to a UE, using one or a plurality of panels (multi-panel). Further, it is studied that the UE performs UL transmission to one or a plurality of TRPs.

In addition, a plurality of TRPs may correspond to the same cell Identifier (ID), or may correspond to different cell IDs. The cell ID may a physical cell ID or may be a virtual cell ID.

FIGS. 2A to 2D are diagrams showing one example of multi-TRP scenarios. In these examples, it is assumed that each TRP is capable of transmitting four different beams, but the invention is not limited thereto.

Figure 2:
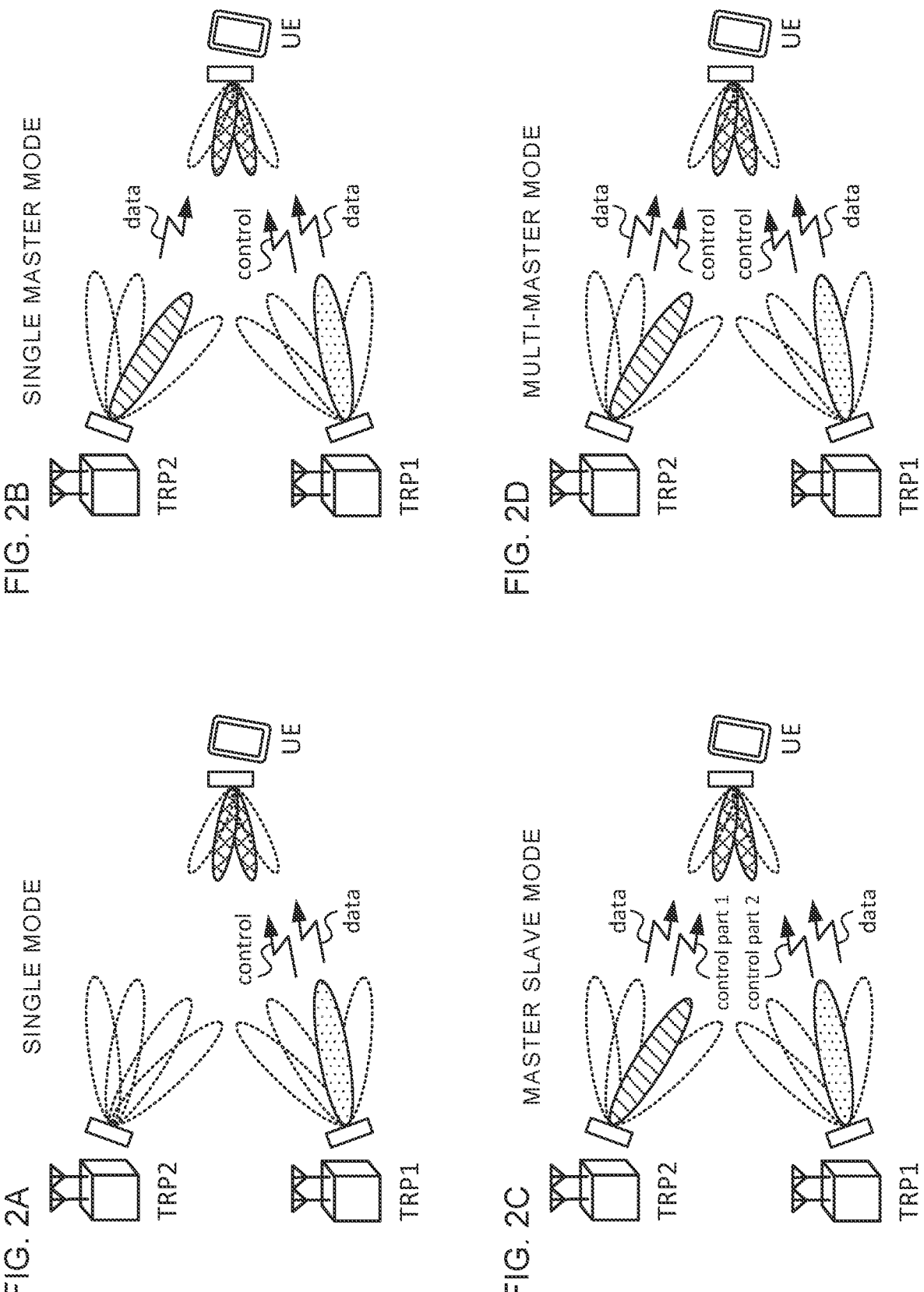
FIGS. 2A to 2D are diagrams showing one example of multi-TRP scenarios.

FIG. 2A shows one example of a case (which may be called a single mode, single TRP, etc.) where only one TRP (in this example, TRP1) in multi-TRP performs transmission to a UE. In this case, the TRP1 transmits both a control signal (PDCCH) and a data signal (PDSCH) to the UE.

FIG. 2B shows one example of a case (which may be called a single master mode) where only one TRP (in this example, TRP1) in multi-TRP transmits a control signal to a UE, and the multi-TRP transmits data signals. The UE receives each PDSCH transmitted from the multi-TRP, based on one downlink control information (DCI).

FIG. 2C shows one example of a case (which may be called a master slave mode) where each of multi-TRP transmits a part of a control signal to a UE, and the multi-TRP transmits data signals. The TRP1 may transmit a part 1 of a control signal (DCI), and the TRP2 may transmit a part 2 of the control signal (DCI). The part 2 of the control signal may be dependent on the part 1. Based on these parts of the DCI, the UE receives each PDSCH transmitted from the multi-TRP.

FIG. 2D shows one example of a case (which may be called a multi-master mode) where each of multi-TRP transmits a different control signal to a UE, and the multi-TRP transmits data signals. The TRP1 may transmit a first control signal (DCI), and the TRP2 may transmit a second control signal (DCI). Based on these pieces of the DCI, the UE receives each PDSCH transmitted from the multi-TRP.

In the case such as FIG. 2B where a plurality of PDSCHs (which may be called multiple PDSCH) from multi-TRP are scheduled using one DCI, the DCI may be called single DCI (S-DCI, single PDCCH). Further, in the case such as FIG. 2D where a plurality of PDSCHs from multi-TRP are scheduled respectively using a plurality of pieces of DCI, the plurality of pieces of DCI may be called multi-DCI (M-DCI, multiple PDCCH).

Each TRP of multi-TRP may transmit a respective different Code Word (CW) and different layer. As one aspect of multi-TRP transmission, Non-Coherent Joint Transmission (NCJT) is studied.

In NCJT, for example, the TRP1 modulates a first code word to map, performs layer mapping on the first number of layers (e.g., 2 layers) using first precoding, and transmits a first PDSCH. Further, the TRP2 modulates a second code word to map, performs layer mapping on the second number of layers (e.g., 2 layers) using second precoding, and transmits a second PDSCH.

In addition, a plurality of PDSCHS (multiple PDSCH) subjected to NCJT may be defined to overlap partially or completely with respect to at least one of the time and frequency domains. In other words, at least one of time and frequency resources may overlap in the first PDSCH from the first TRP and the second PDSCH from the second TRP.

These first and second PDSCHs may be assumed to be not in a Quasi-Co-Location (QCL) relationship (not quasi-co-located). Reception of multiple PDSCH may be read with simultaneous reception of PDSCHs that are not some QCL type (e.g., QCL-Type-D).

(PDSCH Repetitions Across Multi-TRP)

It is studied to support PDSCH repetitions across multi-TRP. At least one of the following repetition schemes across multi-TRP may be supported in the frequency domain, layer (spatial) domain or time domain.

Repetitions subjected to space division multiplexing (SDM): Scheme 1a

Repetitions subjected to frequency division multiplexing (FDM): Schemes 2a and 2b.

Repetitions subjected to time division multiplexing (TDM): Schemes 3 and 4

At least one of these schemes may be supported for URLLC.

Figure 3:
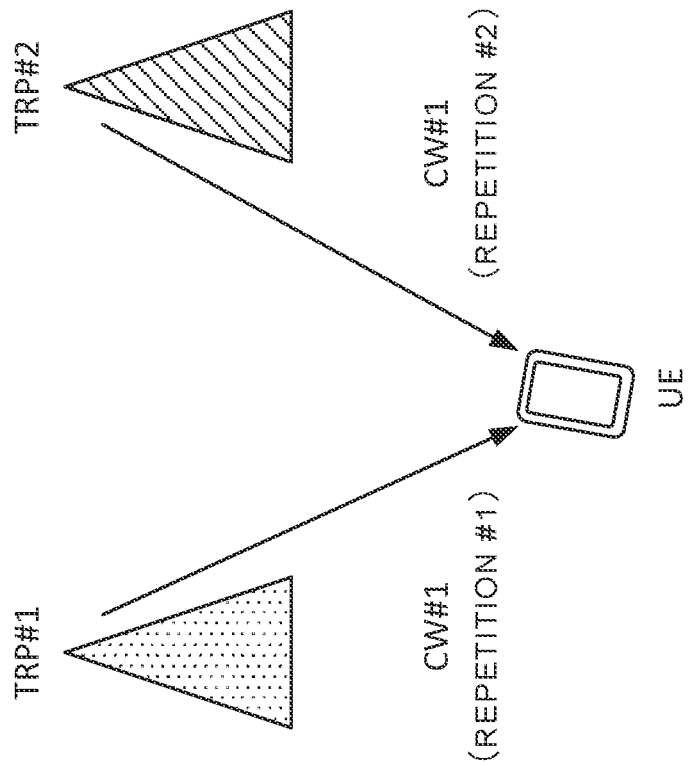
FIG. 3 is a diagram showing one example of PDSCH repetitions from multi-TRP.

For example, as shown in FIG. 3, as PDSCH repetitions, the TRP #1 and TRP #2 transmit repetitions #1, #2 of code word (CW) #1, respectively.

[Scheme 1a]

This scheme may use n ($n <= N_s$ (the number of spatial resources, the number of layers, the number of layer sets)) TCI states within a single slot, and use overlapped time and frequency resource allocations. Each transmission occasion may be one layer, or one set (layer set) of same transport blocks (TBs). Each layer or layer set may be associated with one TCI state and one set of DMRS ports. A single code word accompanied with one redundancy version (RV) may be used across all spatial layers or layer sets. In terms of the UE, different coded bits are mapped to different layers or different layer sets, using the same mapping rule as in Rel. 15.

Figure 4:
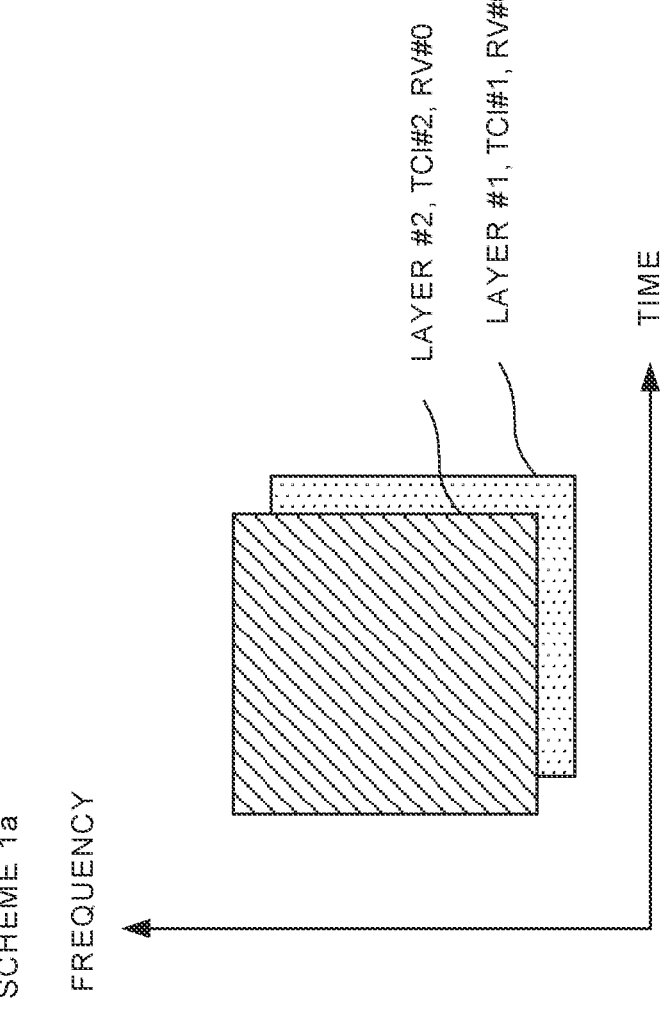
FIG. 4 is a diagram showing one example of scheme 1a of PDSCH repetitions.

For example, as shown in FIG. 4, the repetitions #1, #2 in FIG. 3 are respectively mapped to layers #1, #2 in mutually overlapping time and frequency domains. The UE receives the repetition #1 using the TCI state #1 and RV #0, and receives the repetition #2 using the TCI state #2 and RV #0. The different TCI states and the same RV are used for the repetitions #1, #2.

[Scheme 2]

This scheme uses n ($n <= N_f$ (the number of frequency resources)) TCI states within a single slot, and may use non-overlapped frequency resource allocations. Each of the non-overlapped frequency resource allocations may be associated with one TCI state. The same single or a plurality of DMRS ports may be associated with all non-overlapped frequency resource allocations.

[[Scheme 2a]]

A single code word accompanied with one RV may be used across the entire resource allocation. In terms of the UE, common resource block (RB) mapping (mapping from the code word to the layer similar to Rel. 15) may be applied to across the entire resource allocation.

[[Scheme 2b]]

A single code word accompanied with one RV may be used in respective non-overlapped frequency resource allocations. RVs corresponding to the respective non-overlapped frequency allocations may be the same or may be different.

[[Frequency Resource Allocation]]

The frequency resource allocation may be comb-shaped frequency resource allocation among multi-TRP. For a wideband precoding resource block group (PRG), first ceil ($N_{RB}/2$) RBs may be allocated to a TCI state 1, and remaining floor ($N_{RB}/2$) RBs may be allocated to a TCI state 2. For PRG size="2" or "4", PRGs with even-numbered indexes within the allocated frequency domain resource allocation (FDRA) may be allocated to the TCI state 1, and PRGs with odd-numbered indexes within the allocated FDRA may be allocated to the TCI state 2.

The precoder granularity P (PRG size) may be at least one of values of {2, 4, wideband}. In the case where P is "2" or "4", the PRG is to divide the BWP into P contiguous PRBs.

Figures 5A, 5B:
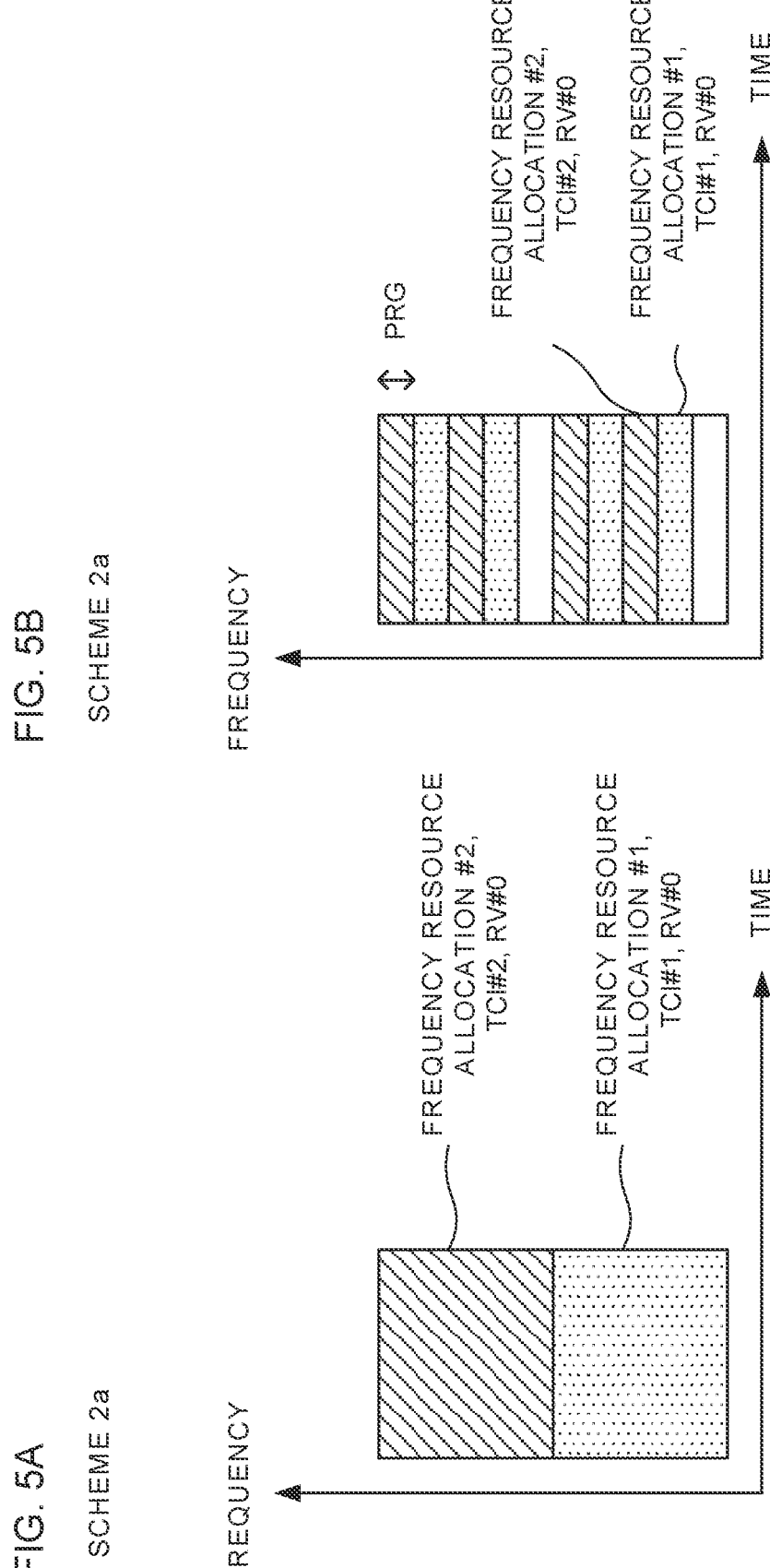
FIGS. 5A and 5B are diagrams showing one example of scheme 2a of PDSCH repetitions.

In the case of using the scheme 2a, for example, as shown in FIGS. 5A and 5B, the repetitions #1, #2 of FIG. 3 are mapped to non-overlapped frequency resource allocations #1, #2 in mutually overlapped time resources, respectively. The UE receives the repetition #1 using the TCI state #1 and RV #0, and receives the repetition #2 using the TCI state #2 and RV #0. Different TCI states and the same RV are used for the repetitions #1 and #2.

Figures 6A, 6B:
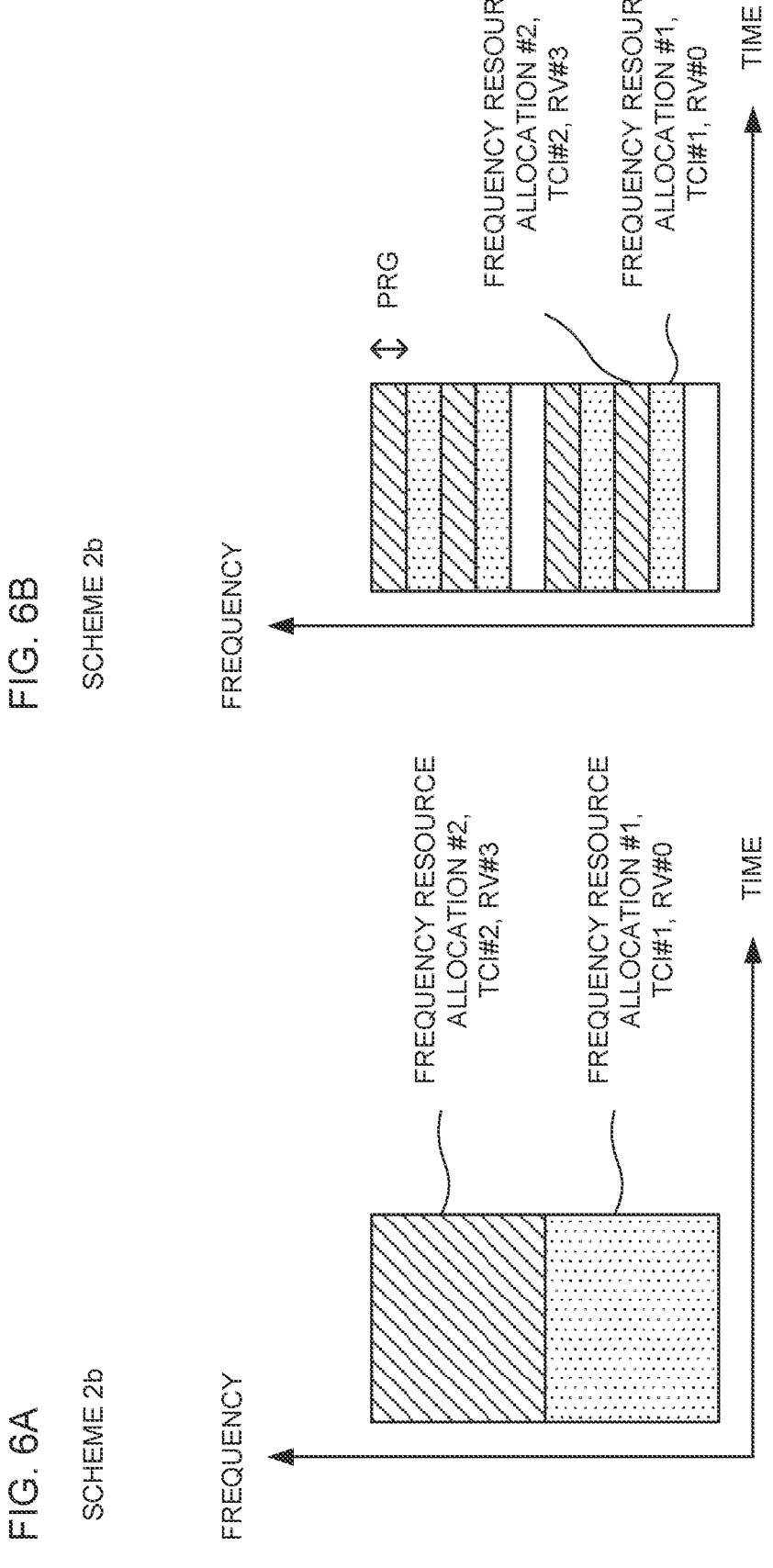
FIGS. 6A and 6B are diagrams showing one example of scheme 2b of PDSCH repetitions.

In the case of using the scheme 2b, for example, as shown in FIGS. 6A and 6B, the repetitions #1, #2 of FIG. 3 are mapped to non-overlapped frequency resource allocations #1, #2 in mutually overlapped time resources, respectively. The UE receives the repetition #1 using the TCI state #1 and RV #0, and receives the repetition #2 using the TCI state #2 and RV #3. Different TCI states and different RVs are used for the repetitions #1 and #2.

As shown in FIGS. 5A and 6A, in the case where the precoder granularity is a wideband (wideband PRG is used), the non-overlapped frequency resource allocation #1 is contiguous PRBs in the first half of the BWP, and the non-overlapped frequency resource allocation #2 is contiguous PRBs in the latter half of the BWP. As shown in FIGS. 5B and 6B, in the case where the precoder granularity is "2" or "4" (the PRG size is "2" or "4"), the non-overlapped frequency resource allocation #1 is PRGs with even-numbered indexes, and the non-overlapped frequency resource allocation #2 is PRGS with odd-numbered indexes.

[Scheme 3]

This scheme may use n ($n <= N_{t1}$ (the number of time resources)) TCI states within a single slot, and use non-overlapped time resource allocations. Each transmission occasion of the TB may have one TCI state and one RV, using the time granularity of a mini-slot. All transmission occasions within the slot may use common MCS having the same single or a plurality of DMRS ports. At least one of the RV and TCI state may be the same or may be different during a plurality of transmission occasions.

Figures 7A, 7B:
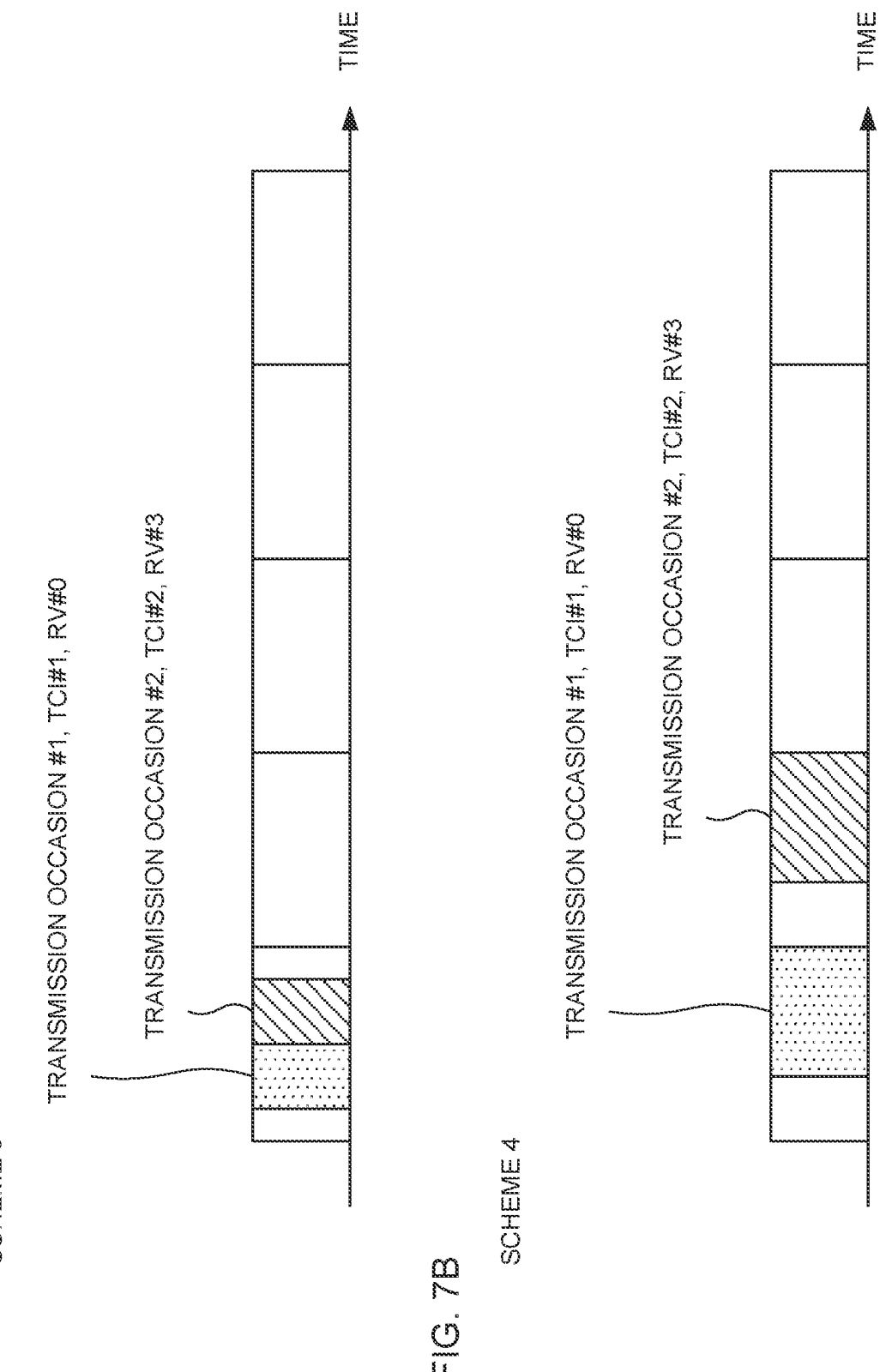
FIGS. 7A and 7B are diagrams showing one example of schemes 3 and 4 of PDSCH repetitions.

For example, as shown in FIG. 7A, the repetitions #1, #2 in FIG. 3 are mapped to transmission occasions #1, #2 within one slot, respectively. The UE receives the repetition #1 using the TCI state #1 and RV #0, and receives the repetition #2 using the TCI state #2 and RV #3. Different TCI states and different RVs are used for the repetitions #1, #2.

[Scheme 4]

This scheme may use n ($n <= N_{t2}$ (the number of time resources)) TCI states in K ($n <= K$) different slots. Each transmission occasion of the TB may have one TCI state and one RV. All transmission occasions across the K slots may use common MCS having the same single or a plurality of DMRS ports. At least one of the RV and TCI state may be the same or may be different during a plurality of transmission occasions.

For example, as shown in FIG. 7B, the repetitions #1, #2 in FIG. 3 are mapped to a transmission occasion #1 within a first slot, and a transmission occasion #2 within a second slot, respectively. The UE receives the repetition #1 using the TCI state #1 and RV #0, and receives the repetition #2 using the TCI state #2 and RV #3. Different TCI states and different RVs are used for the repetitions #1, #2.

According to such multi-TRP scenarios, it is possible to perform more flexible transmission control using a channel of good quality.

NCJT using the multi-TRP/panel has a possibility of using a high rank. In order to support ideal and non-ideal backhaul among a plurality of TRPs, both of single DCI (single PDCCH, e.g., FIG. 2B) and multi-DCI (multiple PDCCH, e.g., FIG. 2D) may be supported. For both the single DCI and multi-DCI, the maximum number of TRPs may be "2".

For single PDCCH design (mainly for ideal backhaul), extension of the TCI is studied. Each TCI codepoint in DCI may correspond to one or two TCI states. The TCI field size may the same as in Rel. 15.

For single PDCCH design (mainly for ideal backhaul), extension of the DMRS is studied. The UE may support next combinations of layers from two TRPs indicated by the antenna port field. For a single code word (CW) and single user (SU), in expressing the form of "the number of layers of the TRP1+the number of layers of the TRP2", combinations of the number of layers of the TRP1 and TRP2 may be one of 1+1, 1+2, 2+1 and 2+2. It has not reached an agreement to support at least one layer combination of 1+3 and 3+1 from two TRPs, support a multi-user (MU) case, and support two CWs. The size of the antenna port field may be the same as in Rel. 15.

For multiple PDCCH design (for both of ideal backhaul and non-ideal backhaul), according to the UE capability, the maximum number of CORESETs may be increased to "5" for each PDCCH configuration information (PDCCH-Config). The maximum number of CORESETs capable of being configured for the same TRP may be up to the number reported by the UE capability. The same TRP may be a same higher layer index (e.g., CORESETPoolIndex) each configured for PDCCH configuration information or for each configured CORESET (when configured). The UE capability may include at least three candidate values.

For multiple PDCCH design (for both of ideal backhaul and non-ideal backhaul), depending on the UE capability, the maximum number of resources of at least one of the BD and CCE may be increased for each serving cell and for each slot.

For only the multiple PDCCH-based design, extension of the PDSCH is studied.

The total number of CWs within a plurality of scheduled PDSCHs may be up to "2". Each PDSCH is scheduled by one PDCCH. The total number of multi-input multi-output (MIMO) layers of the scheduled PDSCH may be up to the number reported with the MIMO capability of the UE. It has not reached an agreement to increase the maximum number of HARQ processes in Rel. 16.

The UE may support different PDSCH scrambling sequences for a plurality of PDSCHs. The UE may support extension of RRC configuration to configure a plurality of dataScramblingIdentityPDSCHs. Each dataScramblingIdentityPDSCH may be associated with the higher layer index (CORESETPoolIndex) for each CORESET to apply to a PDSCH scheduled using DCI detected in the CORESET having the same higher layer index.

For the PDSCH resource allocation, the UE may support a plurality of PDSCHs which are at least one of fully overlapped, partially overlapped and non-overlapped in the time and frequency domains.

With respect to rate matching, for LTE cell-specific reference signal (CRS) may be extended CRS pattern information (lte-CRS-ToMatchAround) to configure a plurality of CRS patterns in the serving cell. The CRS pattern information is a parameter to determine the CRS pattern, and the UE may perform rate matching around the CRS pattern.

Extension of the PUCCH is studied for only the multiple PDCCH-based design.

It may be possible to support both joint ACK/NACK (HARQ-ACK) feedback and separate ACK/NACK feedback. The RRC signaling may be used to switch between the joint feedback and the separate feedback. Both of the semi-static HARQ-ACK codebook and dynamic HARQ-ACK codebook may be supported for the ACK/NACK feedback. For the separate ACK/NACK feedback, it may be possible to configure the higher layer index for each CORESET used in generation of separated HARQ-ACK codebooks, to support both of the semi-static HARQ-ACK codebook and dynamic HARQ-ACK codebook, to support two long PUCCHs subjected to TDM within one slot, to support a short PUCCH and long PUCCH subjected to TDM within one slot, and to support two short PUCCHs subjected to TDM within one slot.

(Default QCL for Multi-TRP)

For single DCI-based multi-TRP/panel transmission using at least one TCI state including QCL-Type-D configured for a serving cell of a scheduled PDSCH, after receiving an activation command of the TCI state for the UE-specific PDSCH, when a time offset between reception of the PDCCH and the corresponding PDSCH is smaller than a threshold (timeDurationForQCL), the UE may assume that the DMRS port of the PDSCH complies with a QCL parameter indicated by the next default TCI state. As the default TCI state, the UE may use a TCI state corresponding to a lowest codepoint among TCI codepoints including two different TCI states activated for the PDSCH. When all TCI codepoints are mapped to a single TCI state, the default TCI state may comply with operation of Rel. 15. It may be a part of the UE capability using the default TCI state for a plurality of PDSCHs based on single DCI.

For single DCI-based multi-TRP/panel transmission, when the time offset between reception of the PDCCH and the corresponding PDSCH is the threshold or more, the UE may assume that the DMRS port of the PDSCH complies with one or two TCI states corresponding to a TCI codepoint indicated by the TCI field in the PDCCH.

For multi-DCI-based multi-TRP/panel transmission, in the case where the CORESETPoolIndex is configured, when the time offset between reception of the PDCCH and the corresponding PDSCH is smaller than the threshold, the UE may assume that the DM-RS port of the PDSCH is QCL with an RS related to a QCL parameter used in the PDCCH with the lowest CORESET index among CORESETS configured for the same value of the CORESETPoolIndex, within respective latest slots where the UE monitors one or more CORESETs each associated with the CORESET-PoolIndex within an active BWP of the serving cell. Support of this function may be indicated (reported) by the UE capability. When the UE does not support this function, irrespective of the CORESETPoolIndex, operation of Rel. 15 may be reused.

Figures 8A, 8B:
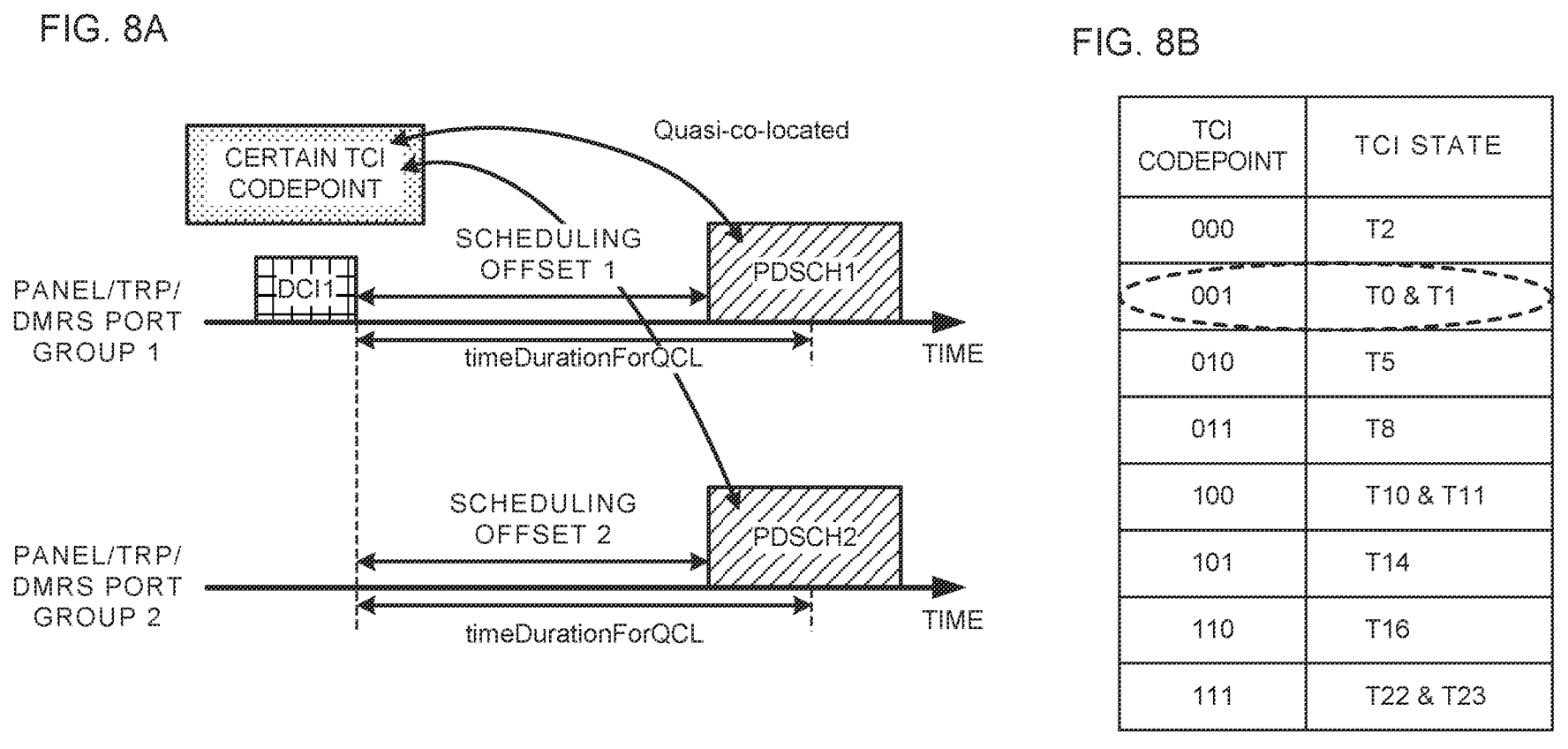

FIGS. 8A and 8B are diagrams showing one example of default QCL of multiple PDSCH based on single DCI. This example corresponds to the example of a single PDCCH shown in FIG. 2B.

The UE receives DCI 1 and PDSCH 1 transmitted from a panel 1 (or, TRP1 or CORESET pool 1). Further, the UE receives a PDSCH 2 transmitted from a panel 2 (or TRP2 or CORESET pool 2).

The DCI 1 schedules reception of the PDSCH 1 and PDSCH 2. A scheduling offset 1 from reception of the DCI 1 to the PDSCH 1 is smaller than a scheduling offset threshold. Further, a scheduling offset 2 from reception of the DCI 1 to the PDSCH 2 is smaller than the scheduling offset threshold.

FIG. 8B shows one example of a correspondence relationship between the TCI codepoint and the TCI state in the TCI field of the DCI 1 assumed in the example of FIG. 8A. In this example, "001" is a lowest codepoint among TCI codepoints including two different TCI states activated for the PDSCH. The UE may use TCI states (TCI state IDs) of T0 and T1 corresponding to the TCI codepoint "001", as default QCL of the PDSCH 1 and PDSCH 2.

However, it is not clarified how to map two different TCI states determined for multiple PDSCH across multi-TRP to each PDSCH (CW). Unless the TCI state of each PDSCH is clarified, the UE is not capable of properly demodulating each PDSCH, and there is the risk that increases in communication throughput are suppressed.

Therefore, the inventors of the present invention conceived methods of properly determining TCI states of multiple PDSCH across multi-TRP.

Embodiments according to the present disclosure will be described below in detail with reference to drawings. Radio communication methods according to respective Embodiments may be used alone, or may be used in combination.

In the present disclosure, the panel, Uplink (UL) transmission entity, TRP, spatial relation, control resource set (Control REsource SET (CORESET)), PDSCH, code word, base station, antenna port (e.g., demodulation reference signal (DeModulation Reference Signal (DMRS)) port) of some signal, antenna port group (e.g., DMRS port group) of some signal, group (e.g., Code Division Multiplexing (CDM) group, reference signal group, CORESET group) for multiplexing, CORESET pool, CW, redundancy version (RV) and layer (MIMO layer, transmission layer, spatial layer) may be read with one another. Further, the panel Identifier (ID) and panel may be read with each other. In the present disclosure, the TRP ID and TRP may be read with each other.

In the present disclosure, NCJT, NCJT using multi-TRP, multiple PDSCH using NCJT, multiple PDSCH, a plurality of PDSCHs from multi-TRP and the like may be read with one another. In addition, the multiple PDSCH may mean a plurality of PDSCHs multiplexed by at least one of SDM, FDM and TDM, may mean a plurality of PDSCHs carrying the same TB or the same CW, or may mean a plurality of PDSCHs to which are applied different UE reception beams (spatial domain reception filters, QCL parameters, TCI states).

In the present disclosure, the default TCI state may mutually be read with default QCL, default QCL assumption and the like. Hereinafter, the TCI state or QCL (QCL assumption) is described as the default TCI state, but the name is not limited thereto.

In addition, the definition of the default TCI state is not limited thereto. For example, for some channel/signal (e.g., PDSCH), the default TCI state may be a TCI state assumed in the case where it is not possible to use a TCI state/QCL designated by DCI, or may be a TCI state assumed in the case where the ICI state/QCL is not designated (or configured).

In the present disclosure, the cell, CC, carrier BWP and band may be read with one another.

In the present disclosure, the index, ID, indicator and resource ID may be read with one another.

The TCI state, TCI state or QCL assumption, QCL assumption, QCL parameter, spatial domain reception filter, UE spatial domain reception filter, spatial domain filter, UE reception beam, DL reception beam, DL precoding, DL precoder, DL-RS, QCL parameter with which the DMRS port complies, RS of QCL-Type-D of TCI state or QCL assumption, and RS of QCL-Type-A of TCI state or QCL assumption may be read with one another. The RS of QCL-Type-D, DL-RS associated with QCL-Type-D, DL-RS having QCL-Type-D, source of DL-RS and CSI-RS may be read with one another.

In the present disclosure, the TCI state may be information (e.g., DL-RS, QCL type, cell for transmitting DL-RS, etc.) about a reception beam (spatial domain reception filter) indicated (configured) for the UE. The QCL assumption may be information (e.g., DL-RS, QCL type, cell for transmitting DL-RS, etc.) about a reception beam (spatial domain reception filter) assumed by the UE, based on transmission or reception of an associated signal (e.g., PRACH).

In the present disclosure, the latest slot, the most recent slot, the latest search space and the most recent search space may be read with one another.

In the present disclosure, DCI format 0_0, DCI that does not include SRI, DCI that does not include indication of spatial relation, and DCI that does not include CIF may be read with one another. In the present disclosure, DCI format 0_1, DCI that includes SRI, DCI that includes indication of spatial relation, and DCI that includes CIF may be read with one another.

(Radio Communication Method)

A UE may receive single DCI for scheduling multiple PDSCH.

<Method of Determining a Plurality of TCI States>

In the method of determining a plurality of TCI states, mapping of two PDSCHs and two TCI states will be described, and for N of two or more, the method is similarly applicable to mapping of N PDSCHs and N TCI states.

In the case where the UE uses two TCI states corresponding to a certain TCI codepoint in two PDSCHS, the UE may map the two TCI states corresponding to the certain codepoint to the two PDSCHs. With at least one of configuration by RRC and activation by MAC CE, two TCI states may be associated with the certain TCI codepoint. The certain codepoint may be a lowest codepoint among TCI codepoints including two different active TCI states for PDSCHs in the case where a time offset between DCI and corresponding multiple PDSCH is shorter than a threshold, or in the case where the TCI Field-Present information is not configured, or may be a TCI codepoint indicated by the TCI field in single DCI for scheduling multiple PDSCH in the case where the time offset between the DCI and corresponding multiple PDSCH is the threshold or more.

The UE may determine order (ID related to the PDSCH) of two PDSCHs. The UE may determine the order of two PDSCHs based on respective resources of two PDSCHs and parameters used respectively in two PDSCHs. The order of two PDSCHs may be associated with resource or parameter of at least one of the PDSCH, CW, HARQ process ID, layer, TB, RV, CORESET (CORESETPoolIndex) for scheduling the PDSCH, order of reception occasions (reception timing, reception start symbol, reception slot) of the PDSCH in the scheme 3 or 4, order of frequencies (frequency resource, RE, PRB, PRG) of the PDSCH in the scheme 2a or 2b, initial transmission and retransmission.

Based on order of two PDSCHs and one of the following mapping 1 and 2, the UE may map two TCI states corresponding to the certain TCI codepoint to the two PDSCHs.

[Mapping 1]

According to order (ascending order or descending order) of TCI state IDs, the UE may determine a first TCI state ID and a second TCI state ID.

[Mapping 2]

The UE may determine a first TCI state ID and a second TCI state ID, according to order (positions, ascending order or descending order) of TCI state IDs notified by at least one 41 configuration and activation.

For mapping 2, for example, in the case where two TCI state IDs associated with the certain TCI codepoint are configured by a list of RRC information element (IE), the first TCI state ID and second TCI state ID are determined according to positions in the list. For example, in the case where two TCI state IDs associated with the certain TCI codepoint are activated by a field of MAC CE, the first TCI state ID and second TCI state ID are determined according to the position in the MAC CE. For example, in the case where two TCI state IDs associated with the certain TCI codepoint are configured or activated by bitmap of RRC or MAC CE, and a bit position in the bitmap corresponds to a TCI state ID, the first TCI state ID and second TCI state ID are determined according to positions of bits corresponding to the two TCI states.

For example, FIG. 9A shows one example of association of the TCI codepoint with the TCI state notified by at least one of configuration by RRC and activation by MAC CE. In this example, the certain TCI codepoint is the lowest codepoint among TCI codepoints including two active TCI states, and is "001". The UE is notified of "0" and "1", as TCI state IDs associated with the certain TCI codepoint. In the case of using the mapping 2 (ascending order of positions of TCI state IDs in notification) for the association, the first TCI state ID is "O", and the second TCI state ID is "1".

Figure 10:
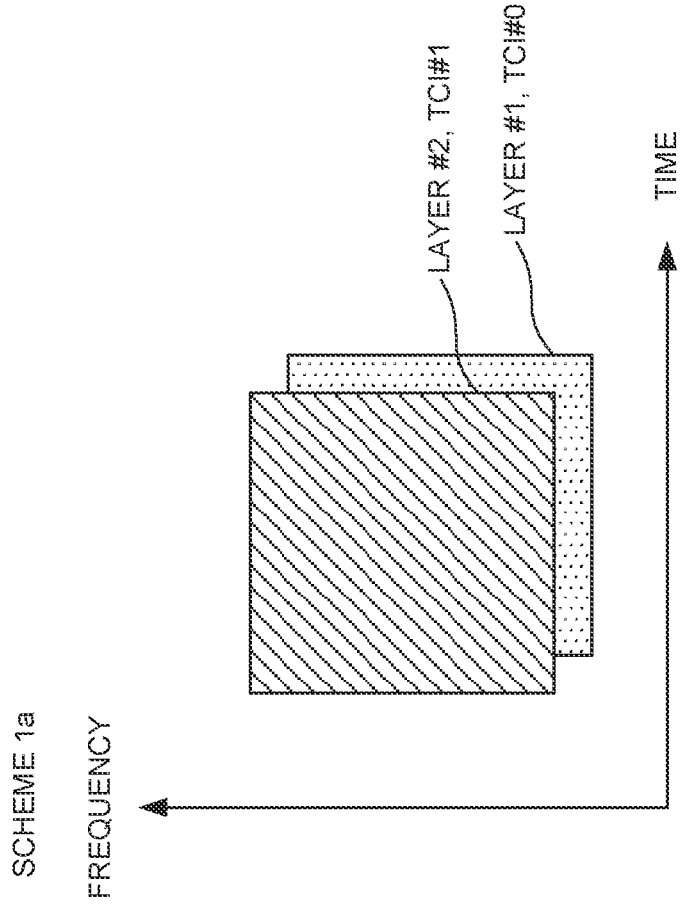

In the case of using the scheme 1a, the first TCI state ID may be used for the layer #1, and the second TCI state ID may be used for the layer #2. In the case of using the mapping 2 for association of FIG. 9A, for example, as shown in FIG. 10, a TCI state ID of the layer #1 is "0", and a TCI state ID of the layer #2 is "1".

Figures 11A, 11B:
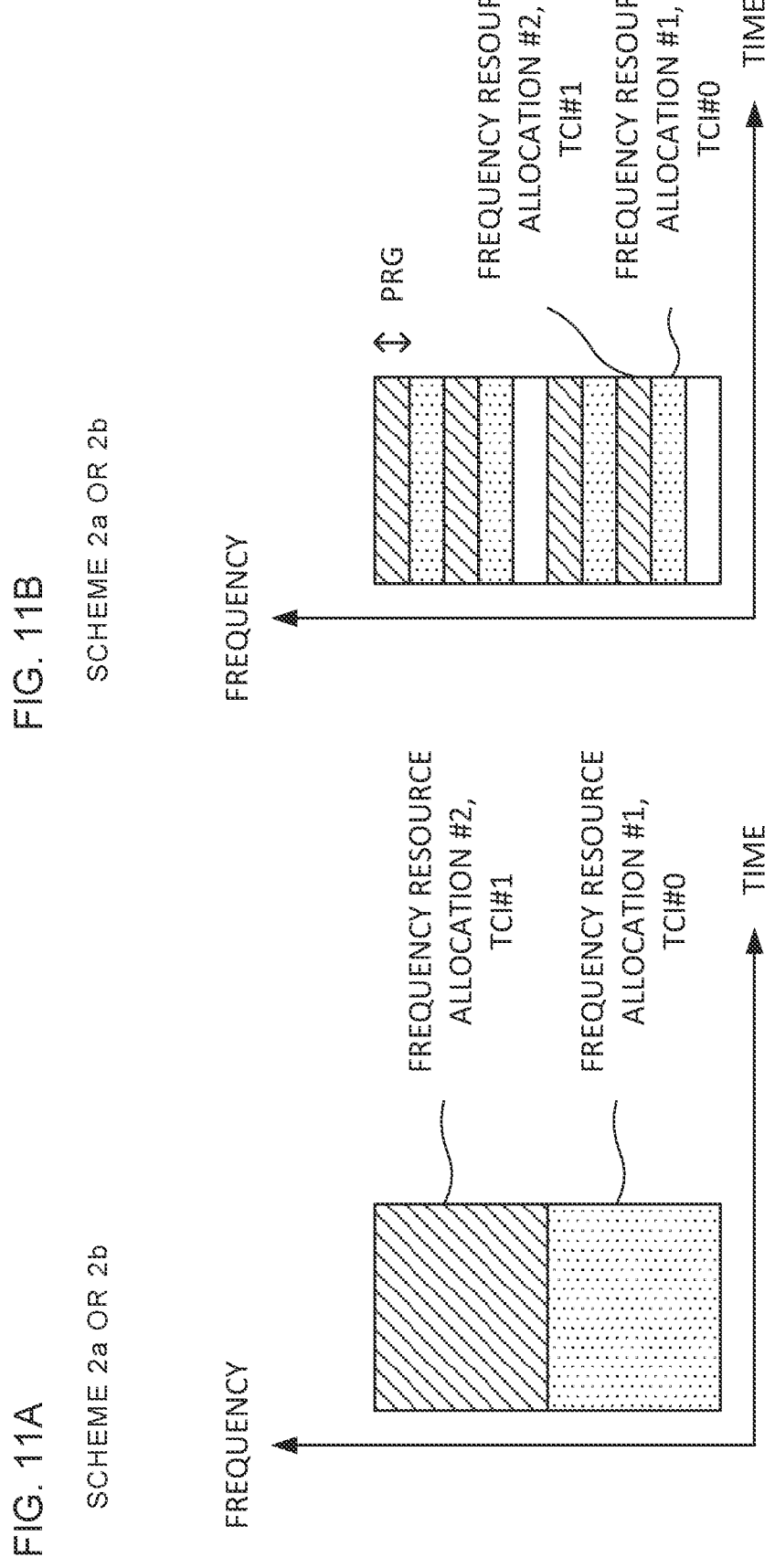
FIGS. 11A and 11B are diagrams showing one example of mapping of two TCI states in scheme 2a or 2b.

In the case of using the scheme 2a or 2b, the first TCI state ID may be used for the frequency resource allocation #1, and the second TCI state ID may be used for the frequency resource allocation #2. In the case of using the mapping 2 for association of FIG. 9A, for example, as shown in FIGS. 11A and 11B, a TCI state ID of the frequency resource allocation #1 is "0", and a TCI state ID of the frequency resource allocation #2 is "1".

Figures 12A, 12B:
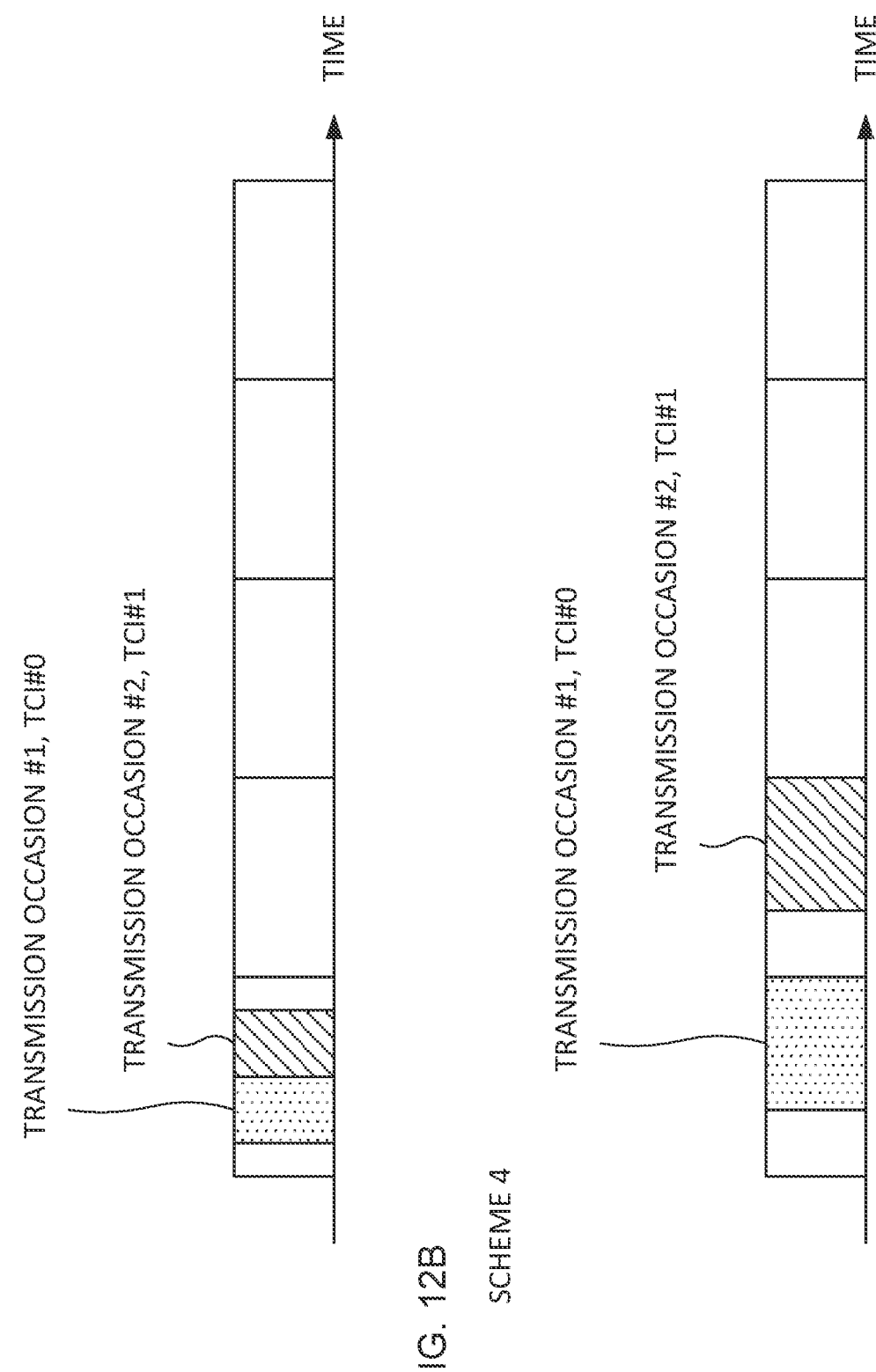
FIGS. 12A and 12B are diagrams showing one example of mapping of two TCI states in scheme 3 or 4.

In the case of using the scheme 3 or 4, the first TCI state ID may be used for the transmission occasion #1, and the second TCI state ID may be used for the transmission occasion #2. In the case of using the mapping 2 for association of FIG. 9A, for example, as shown in FIGS. 12A and 12B, a TCI state ID of the transmission occasion #1 is "0", and a TCI state ID of the transmission occasion #2 is "1".

For example, FIG. 9B shows another example of association of the ICI codepoint with the TCI state notified by at least one of configuration by RRC and activation by MAC CE. In this example, the certain TCI codepoint is the lowest codepoint among TCI codepoints including two active TCI states, and is "001". The UE is notified of "1" and "0", as TCI state IDs associated with the certain TCI codepoint. In the case of using the mapping 1 (ascending order of TCI state IDs) for the association, the first TCI state ID is "0", and the second TCI state ID is "1".

Figure 13:
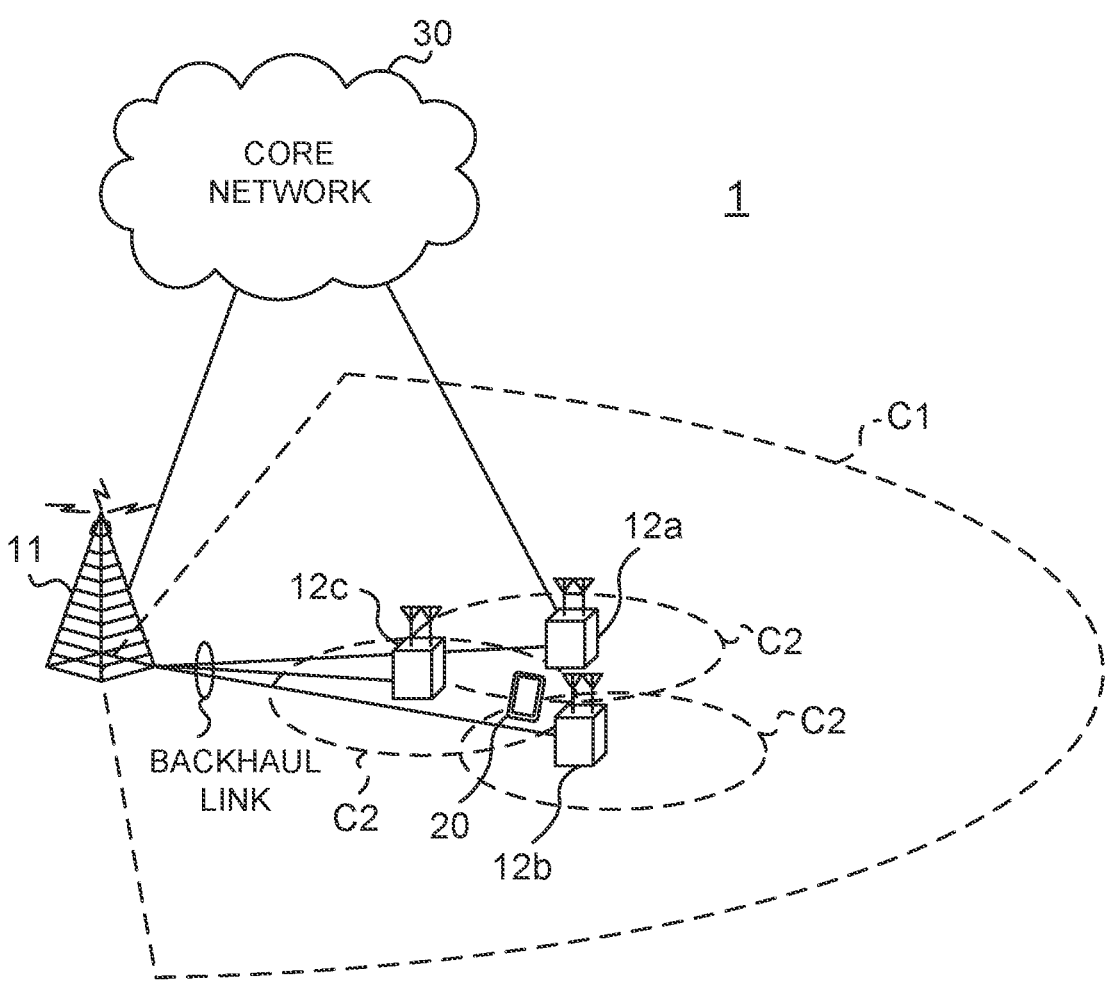
FIG. 13 is a diagram showing one example of a schematic configuration of a radio communication system according to one Embodiment.

Two TCI states for two PDSCHs in the case of using the mapping 1 (ascending order of TCI state IDs) for association of FIG. 13 are similar to FIG. 10, FIGS. 11A and 11B, and FIGS. 12A and 12B.

According to the methods of determining a plurality of TCI states described above, also in the case where N active TCI states are associated with one TCI codepoint, the UE is capable of properly mapping N TCI states to N PDSCHs.

<Method of Determining One TCI State>

In the case where application conditions are met, the UE may assume (may use, may determine) one default QCL for all PDSCHs (repetitions).

The single QCL application conditions may be that TCI Field-Present information (tci-PresentInDCI) is not configured.

The single QCL application conditions may be that TCI Field-Present information is configured, and that any TCI codepoint is not associated with two active TCI states.

One default QCL in the case where the single QCL application conditions are met may be one of the following TCI states and QCL assumptions.

A TCI state having a lowest ID or highest ID of a CORESET may be used, or TCI state having the lowest ID or highest ID of a CORESET on a latest slot One active TCI state associated with a lowest codepoint among TCI codepoints associated with one active TCI state TCI state having the lowest ID among active TCI states TCI state of a CORESET of DCI for scheduling multiple PDSCH One default QCL notified explicitly by MAC CE or RRC (new parameter, new field)

First default QCL in two default QCLs notified explicitly by MAC CE or RRC (new parameter, new field)

TCI state having the lowest ID or highest ID in two default QCLs notified explicitly by MAC CE or RRC (new parameter, new field)

According to the methods of determining one TCI state described above, in the case where TCI Field-Present information is not configured, or in the case where there is no TCI codepoint associated with two active TCI states, the UE is capable of properly determining one default QCL for multiple PDSCH.

(Radio Communication System)

A configuration of a radio communication system according to one Embodiment of the present disclosure will be described below. In the radio communication system, communication is performed by using one of radio communication methods according to the respective above-mentioned Embodiments of the disclosure or combination thereof.

FIG. 13 is a diagram showing one example of a schematic configuration of the radio communication system according to one Embodiment. The radio communication system 1 may be a system for actualizing communication using Long Term Evolution (LTE), 5th generation mobile communication system New Radio (5G NR) and the like specified by Third Generation Partnership Project (3GPP).

Further, the radio communication system 1 may support dual connectivity (Multi-RAT Dual Connectivity (MR-DC)) among a plurality of Radio Access Technologies (RAT). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and the like.

In EN-DC, a base station (eNB) of LTE (E-UTRA) is a master node (Master Node (MN)), and a base station (gNB) of NR is a secondary node (Secondary Node (SN)). In NE-DC, a base station (gNB) of NR is an MN, and a base station (eNB) of LTE (E-UTRA) is an SN.

The radio communication system 1 may support dual connectivity (e.g., dual connectivity (NR-NR Dual Connectivity (NN-DC) where both of the MN and SN are the base stations (gNB) of NR) among a plurality of base stations in the same RAT.

The radio communication system 1 may be provided with a base station 11 for forming a macrocell C1 with relatively wide coverage, and base stations 12 (12a to 12c) disposed inside the macrocell C1 to form small cells C2 narrower than the macrocell C1. A user terminal 20 may be positioned in at least one cell. The arrangement, numbers and the like of each cell and user terminal 20 are not limited to the aspect shown in the figure. Hereinafter, in the case of not distinguishing between the base stations 11 and 12, the stations are collectively called a base station 10.

The user terminal 20 may connect to at least one of a plurality of base stations 10. The user terminal 20 may use at least one of carrier aggregation (Carrier Aggregation (CA)) using a plurality of component carriers (Component Carrier (CC)) and dual connectivity (DC).

Each CC may be included in at least one of a first frequency band (Frequency Range 1 (FR1)) and second frequency band (Frequency Range 2 (FR2)). The macrocell C1 may be included in the FR1, and the small cell C2 may be included in the FR2. For example, the FR1 may be a frequency band (sub-6 GHZ) of 6 GHZ or less, and the FR2 may be a frequency band (above-24 GHz) higher than 24 GHZ. In addition, the frequency bands, definitions and the like of the FR1 and FR2 are not limited thereto, and for example, the FR1 may correspond to a frequency band higher than the FR2.

Further, in each CC, the user terminal 20 may perform communication using at least one of Time Division Duplex (TDD) and Frequency Division Duplex (FDD).

A plurality of base stations 10 may be connected by cables (e.g., optical fiber in conformity with Common Public Radio Interface (CPRI), X2 interface, etc.), or by radio (e.g., NR communication). For example, in the case of using NR communication as backhaul between the base stations 11 and 12, the base station 11 corresponding to a higher station may be called an Integrated Access Backhaul (IAB) donor, and the base station 12 corresponding to a relay station (relay) may be called an IAB node.

The base station 10 may be connected to a core network 30 via another base station 10 or directly. For example, the core network 30 may include at least one of Evolved Packet Core (EPC), 5G Core Network (5GCN), Next Generation Core (NGC) and the like.

The user terminal 20 may be a terminal supporting at least one of communication schemes such as LTE, LTE-A, and 5G.

In the radio communication system 1, an Orthogonal Frequency Division Multiplexing (OFDM)-based radio access scheme may be used. For example, on at least one of downlink (Downlink (DL)) and uplink (Uplink (UL)) may be used Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA) and the like.

The radio access scheme may be called a waveform. In addition, in the radio communication system 1, another radio access scheme (e.g., another single carrier transmission scheme, another multi-carrier transmission scheme) may be used for the radio access scheme of UL and DL.

As downlink channels, in the radio communication system 1 may be used a downlink shared channel (Physical Downlink Shared Channel (PDSCH)) shared by user terminals 20, broadcast channel (Physical Broadcast Channel (PBCH)), downlink control channel (Physical Downlink Control Channel (PDCCH)) and the like.

Further, as uplink channels, in the radio communication system 1 may be used an uplink shared channel (Physical Uplink Shared Channel (PUSCH)) shared by user terminals 20, uplink control channel (Physical Uplink Control Channel (PUCCH)), random access channel (Physical Random Access Channel (PRACH)) and the like.

User data, higher layer control information, System Information Block (SIB) and the like are transmitted on the PDSCH. The user data, higher layer control information and the like may be transmitted on the PUSCH. Further, Master Information Block (MIB) may be transmitted on the PBCH.

Lower layer control information may be transmitted on the PDCCH. For example, the lower layer control information may include downlink control information (Downlink Control Information (DCI)) including scheduling information of at least one of the PDSCH and PUSCH.

In addition, DCI for scheduling the PDSCH may be called a DL assignment, DL DCI and the like, and DCI for scheduling the PUSCH may be called a UL grant, UL DCI and the like. In addition, the PDSCH may be read with DL data, and the PUSCH may be read with UL data.

For detection of the PDCCH, a control resource set (COntrol REsource SET (CORESET)) and search space may be used. The CORESET corresponds to resources to search for the DCI. The search space corresponds to a search region and search method of PDCCH candidates. One CORESET may be associated with one or a plurality of search spaces. The UE may monitor the CORESET related to some search space based on search space configuration.

One search space may correspond to PDCCH candidates corresponding to one or a plurality of aggregation levels. One or a plurality of search spaces may be called a search space set. In addition, the "search space", "search space set", "search space configuration", "search space set configuration", "CORESET", "CORESET configuration" and the like of the present disclosure may be read with one another.

On the PUCCH may be transmitted uplink control information (Uplink Control Information (UCI)) including at least one of Channel State Information (CSI), receipt confirmation information (for example, which may be called Hybrid Automatic Repeat reQuest ACKnowledgement (HARQ-ACK), ACK/NACK and the like) and Scheduling Request (SR). A random access preamble to establish connection with the cell may be transmitted on the PRACH.

In addition, in the present disclosure, the downlink, uplink and the like may be expressed without attaching "link". Further, various channels may be expressed without attaching "Physical" at the beginning.

In the radio communication system 1 may be transmitted a Synchronization Signal (SS), Downlink Reference Signal (DL-RS) and the like. As the DL-RS, in the radio communication system 1 may be transmitted a Cell-specific Reference Signal (CRS), Channel State Information Reference Signal (CSI-RS), demodulation reference signal (DeModulation Reference Signal (DMRS)), Positioning Reference signal (PRS), Phase Tracking Reference Signal (PTRS) and the like.

For example, the synchronization signal may be at least one of a Primary Synchronization Signal (PSS) and Secondary Synchronization Signal (SSS). A signal block including the SS (PSS, SSS) and PBCH (and DMRS for the PBCH) may be called an SS/PBCH block, SS Block (SSB) and the like. In addition, the SS, SSB and the like may also be called the reference signal.

Further, in the radio communication system 1, a Sounding Reference Signal (SRS), demodulation reference signal (DMRS) and the like may be transmitted as an Uplink Reference Signal (UL-RS). In addition, the DMRS may be called a user terminal-specific reference signal (UE-specific Reference Signal).

(Base Station)

Figure 14:
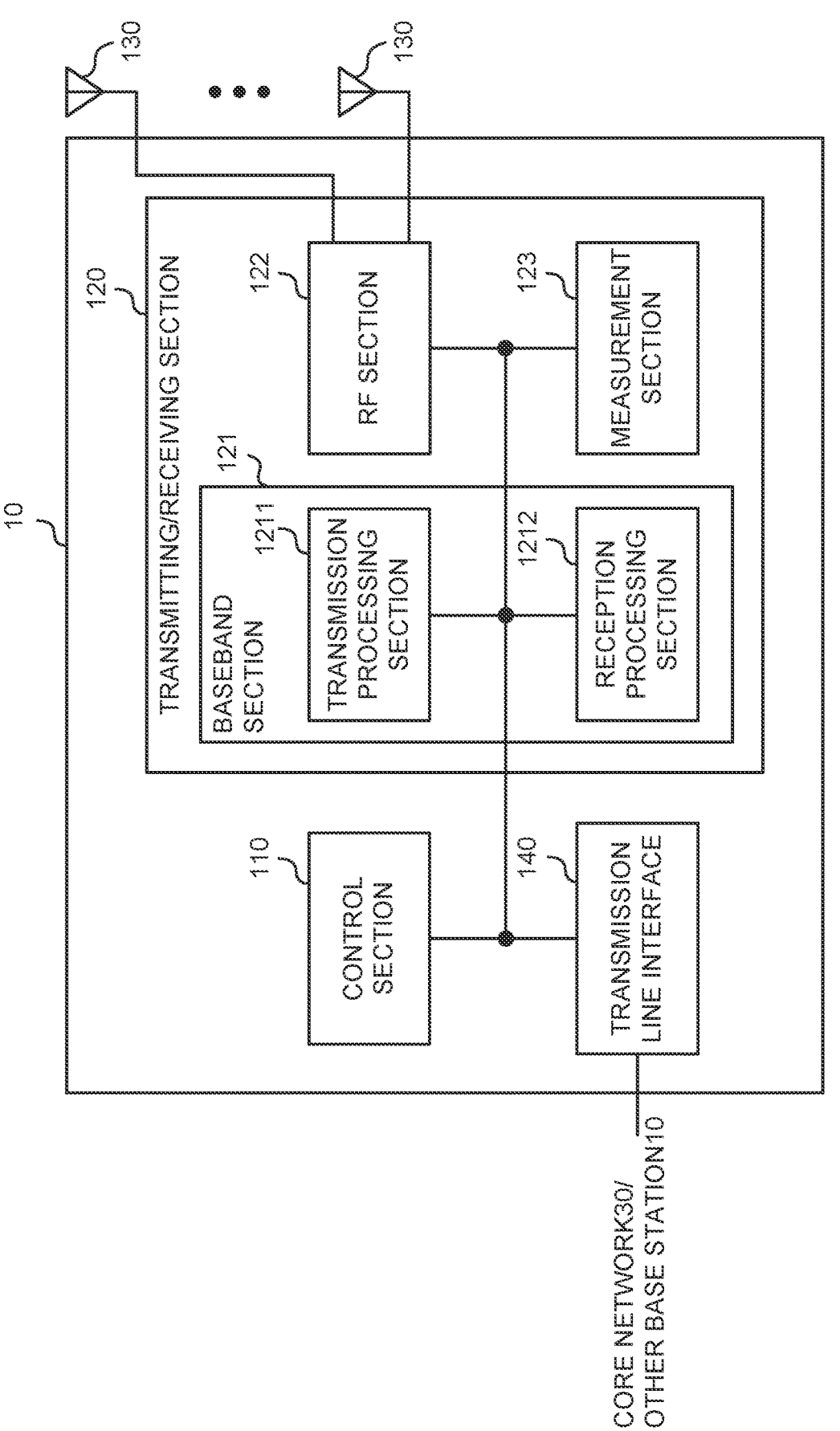
FIG. 14 is a diagram showing one example of a configuration of a base station according to one Embodiment.

FIG. 14 is a diagram showing one example of a configuration of the base: station according to one Embodiment. The base station 10 is provided with a control section 110, transmitting/receiving section 120, transmitting/receiving antennas 130, and transmission line interface 140. In addition, the base station may be provided with one or more of each of the control section 110, transmitting/receiving section 120, transmitting/receiving antenna 130, and transmission line interface 140.

In addition, this example mainly illustrates function blocks of feature parts in this Embodiment, and the base station 10 may be assumed to have other function blocks required for radio communication. A part of processing of each section described below may be omitted.

The control section 110 performs control of the entire base station 10. The control section 110 is capable of being comprised of a controller, control circuit and the like explained based on common recognition in the technical field according to the present disclosure.

The control section 110 may control generation of signals, scheduling (e.g., resource allocation, mapping) and the like. The control section 110 may control transmission/reception, measurement and the like using the transmitting/receiving section 120, transmitting/receiving antenna 130 and transmission line interface 140. The control section 110 may generate data, control information, sequence and the like to transmit as a signal, and transfer the resultant to the transmitting/receiving section 120. The control section 110 may perform call processing (configuration, release, etc.) of a communication channel, state management of the base station 10, management of radio resources and the like.

The transmitting/receiving section 120 may include a baseband section 121, Radio Frequency (RF) section 122 and measurement section 123. The baseband section 121 may include a transmission processing section 1211 and reception processing section 1212. The transmitting/receiving section 120 is capable of being comprised of a transmitter/receiver, RF circuit, baseband circuit, filter, phase shifter, measurement circuit, transmitting/receiving circuit and the like explained based on the common recognition in the technical field according to the present disclosure.

The transmitting/receiving section 120 may be comprised as an integrated transmitting/receiving section, or may be comprised of a transmitting section and a receiving section. The transmitting section may be comprised of a transmission processing section 1211 and RF section 122. The receiving section may be comprised of a reception processing section 1212, RF section 122, and measurement section 123.

The transmitting/receiving antenna 130 is capable of being comprised of an antenna, for example, an array antenna and the like explained based on the common recognition in the technical field according to the present disclosure.

The transmitting/receiving section 120 may transmit the above-mentioned downlink channel, synchronization signal, downlink reference signal and the like. The transmitting/receiving section 120 may receive the above-mentioned uplink channel, uplink reference signal and the like.

The transmitting/receiving section 120 may form at least one of a transmission beam and reception beam, using digital beam forming (e.g., precoding), analog beam forming (e.g., phase rotation) and the like.

The transmitting/receiving section 120 (transmission processing section 1211) may perform, for example, on the data, control information and the like acquired from the control section 110, processing of Packet Data Convergence Protocol (PDCP) layer, processing (e.g., RLC retransmission control) of Radio Link Control (RLC) layer, processing (e.g., HARQ retransmission control) of Medium Access Control (MAC) layer and the like to generate a bit sequence to transmit.

The transmitting/receiving section 120 (transmission processing section 1211) may perform, on the bit sequence to transmit, transmission processing such as channel coding (which may include error correcting coding), modulation, mapping, filter processing, Discrete Fourier Transform (DFT) processing (as necessary), Inverse Fast Fourier Transform (IFFT) processing, precoding and digital-analog conversion, and output a baseband signal.

The transmitting/receiving section 120 (FR section 122) may perform modulation to a radio frequency band, filter processing, amplification and the like on the baseband signal to transmit a signal of the radio frequency band via the transmitting/receiving antenna 130.

On the other hand, the transmitting/receiving section 120 (RF section 122) may perform amplification, filter processing, demodulation to a baseband signal and the like on a signal of the radio frequency band received by the transmitting/receiving antenna 130.

The transmitting/receiving section 120 (reception processing section 1212) may apply reception processing such as analog-digital conversion, Fast Fourier Transform (FTT) processing, Inverse Discrete Fourier Transform (IDFT) processing (as necessary), filter processing, demapping, demodulation, decoding (which may include error correcting decoding), MAC 1 layer processing, processing of RCL layer, and processing of PDCP layer to the acquired baseband signal, and acquire the user data, and the like.

The transmitting/receiving section 120 (measurement section 123) may perform measurement on a received signal. For example, based on the received signal, the measurement section 123 may perform Radio Resource Management (RRM) measurement, Channel State Information (CSI) measurement and the like. The measurement section 123 may measure received power (e.g., Reference Signal Received Power (RSRP)), received quality (e.g., Reference Signal Received Quality (RSRQ), Signal to Interference plus Noise Ratio (SINR), Signal to Noise Ratio (SNR)), signal strength (e.g., Received Signal Strength Indicator (RSSI)), propagation path information (e.g., CSI) and the like. The measurement result may be output to the control section 110.

The transmission line interface 140 may transmit/receive signals (backhaul signaling) to/from an apparatus included in the core network 30, another base station 10 and the like to perform acquisition, transmission and the like of user data (user plain data), control plain data and the like for the user terminal 20.

In addition, the transmitting section and receiving section of the base station 10 in the present disclosure may be comprised of at least one of the transmitting/receiving section 120, transmitting/receiving antenna 130 and transmission line interface 140.

In addition, the transmitting/receiving section 120 may transmit one or both of a plurality of downlink shared channels (Physical Downlink Shared Channels (PDSCHs)) (multiple PDSCH) scheduled based on one downlink control information (single PDCCH).

(User Terminal)

Figure 15:
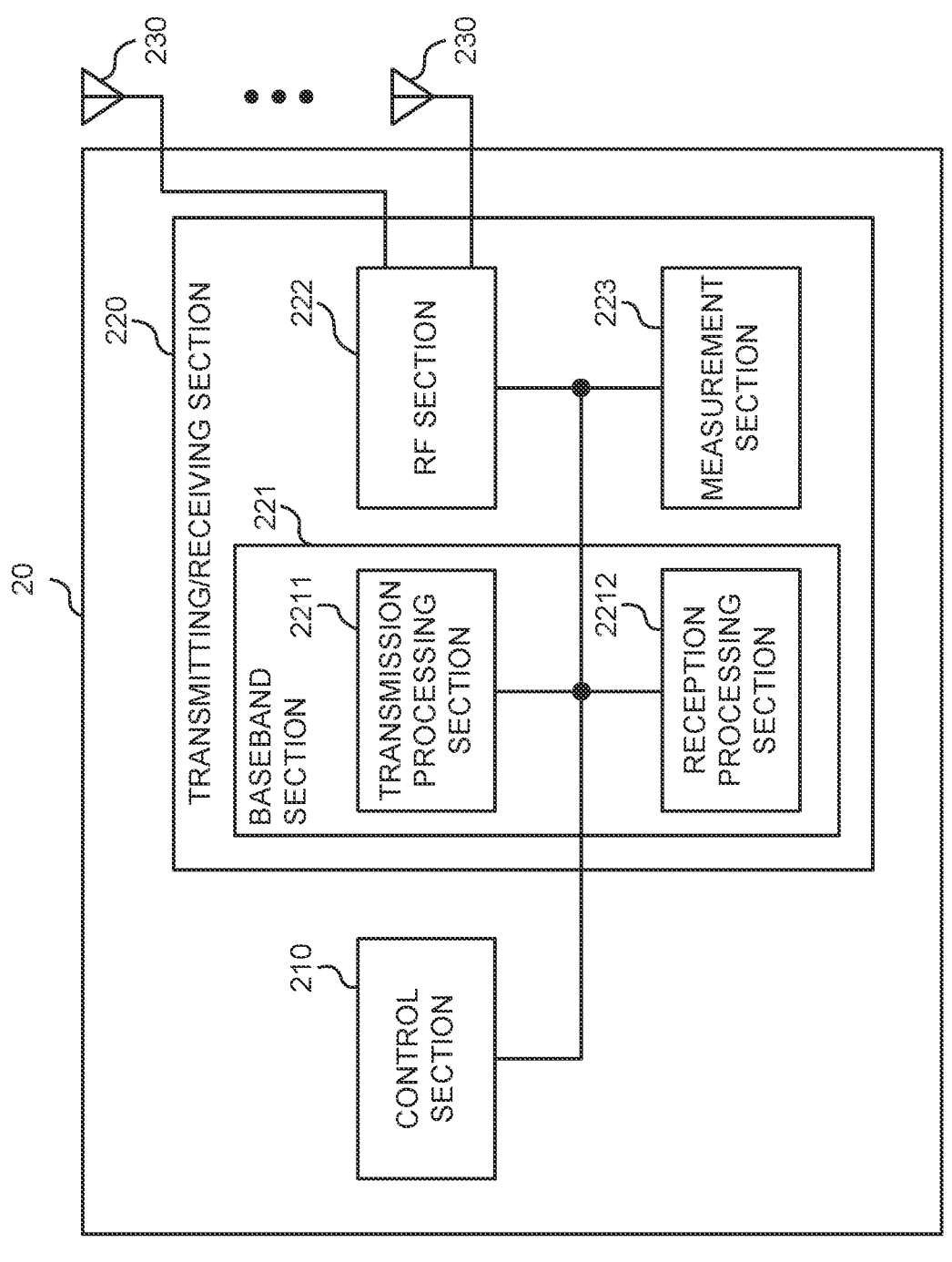
FIG. 15 is a diagram showing one example of a configuration of a user terminal according to one Embodiment.

FIG. 15 is a diagram showing one example of a configuration of the user terminal according to one Embodiment. The user terminal 20 is provided with a control section 210, transmitting/receiving section 220, and transmitting/receiving antennas 230. In addition, the user terminal may be provided with one or more of each of the control section 210, transmitting/receiving section 220 and transmitting/receiving antenna 230.

In addition, this example mainly illustrates function blocks of feature parts in this Embodiment, and the user terminal 20 may be assumed to have other function blocks required for radio communication. A part of processing of each section described below may be omitted.

The control section 210 performs control of the entire user terminal 20. The control section 210 is capable of being comprised of a controller, control circuit and the like explained based on the common recognition in the technical field according to the present disclosure.

The control section 210 may control generation of signals, mapping and the like. The control section 210 may control transmission/reception, measurement and the like using the transmitting/receiving section 220 and transmitting/receiving antenna 230. The control section 210 may generate data, control information, sequence and the like to transmit as a signal, and transfer the resultant to the transmitting/receiving section 220.

The transmitting/receiving section 220 may include a baseband section 221, RF section 222 and measurement section 223. The baseband section 221 may include a transmission processing section 2211 and reception processing section 2212. The transmitting/receiving section 220 is capable of being comprised of a transmitter/receiver, RF circuit, baseband circuit, filter, phase shifter, measurement circuit, transmitting/receiving circuit and the like explained based on the common recognition in the technical field according to the present disclosure.

The transmitting/receiving section 220 may be comprised as an integrated transmitting/receiving section, or may be comprised of a transmitting section and a receiving section. The transmitting section may be comprised of a transmission processing section 2211 and RF section 222. The receiving section may be comprised of a reception processing section 2212, RF section 222, and measurement section 223.

The transmitting/receiving antenna 230 is capable of being comprised of an antenna, for example, an array antenna and the like explained based on the common recognition in the technical field according to the present disclosure.

The transmitting/receiving section 220 may receive the above-mentioned downlink channel, synchronization signal, downlink reference signal and the like. The transmitting/receiving section 220 may transmit the above-mentioned uplink channel, uplink reference signal and the like.

The transmitting/receiving section 220 may form at least one of a transmission beam and reception beam, using digital beam forming (e.g., precoding), analog beam forming (e.g., phase rotation) and the like.

The transmitting/receiving section 220 (transmission processing section 2211) may perform, for example, on the data, control information and the like acquired from the control section 210, processing of PDCP layer, processing (e.g., RLC retransmission control) of RLC layer, processing (e.g., HARQ retransmission control) of MAC layer and the like to generate a bit sequence to transmit.

The transmitting/receiving section 220 (transmission processing section 2211) may perform, on the bit sequence to transmit, transmission processing such channel coding (which may include error correcting coding), modulation, mapping, filter processing, DET processing (as necessary), IFFT processing, precoding and digital-analog conversion, and output a baseband signal.

In addition, whether or not to apply the DET processing may be based on configuration of transform precoding. In the case where transform precoding is enabled on some channel (e.g., PUSCH), the transmitting/receiving section 220 (transmission processing section 2211) may perform the DFT processing as the above-mentioned transmission processing so as to transmit the channel using a DFT-s-OFDM waveform. In the other case, the section may not perform the DFT processing as the above-mentioned transmission processing.

The transmitting/receiving section 220 (FR section 222) may perform modulation to a radio frequency band, filter processing, amplification and the like on the baseband signal to transmit a signal of the radio frequency band via the transmitting/receiving antenna 230.

On the other hand, the transmitting/receiving section 220 (RF section 222) may perform amplification, filter processing, demodulation to a baseband signal and the like on a signal of the radio frequency band received by the transmitting/receiving antenna 230.

The transmitting/receiving section 220 (reception processing section 2212) may apply reception processing such as analog-digital conversion, FTT processing, IDFT processing (as necessary), filter processing, demapping, demodulation, decoding (which may include error correcting decoding), MAC layer processing, processing of RCL layer, and processing of PDCP layer to the acquired baseband signal, and acquire the user data, and the like.

The transmitting/receiving section 220 (measurement section 223) may perform measurement on a received signal. For example, based on the received signal, the measurement section 223 may perform RRM measurement, CSI measurement and the like. The measurement section 223 may measure received power (e.g., RSRP), received quality (e.g., RSRQ, SINR, SNR), signal strength (e.g., RSSI), propagation path information (e.g., CSI) and the like. The measurement result may be output to the control section 210.

In addition, the transmitting section and receiving section of the user terminal 20 in the present disclosure may be comprised of at least one of the transmitting/receiving section 220 and transmitting/receiving antenna 230.

The transmitting/receiving section 220 may receive one downlink control information (DCI) for scheduling two Physical Downlink Shared Channels (PDSCHs). When a certain codepoint of a Transmission Configuration Indication (TCI) field is used in reception of the two PDSCHs, the control section 210 may map two TCI state IDs associated with the certain codepoint to the two PDSCHs respectively.

The certain codepoint may be one of a lowest codepoint among codepoints of the TCI field associated with two different active TCI states for PDSCHs in the case where a time offset between the DCI and the two PDSCHs is shorter than a threshold or in the case where the TCI field is not configured, and a codepoint indicated by the TCI field in the DCI in the case where the time offset between the DCI and the two PDSCHs is the threshold or more.

Based on positions of the two TCI state IDs in notification of the two TCI state IDs, or order of the two TCI state IDs and order of the two PDSCHs, the control section 210 may map the two TCI state IDs to the two PDSCHs respectively.

Based on at least one of respective resources of the two PDSCHs and parameters respectively used in the two PDSCHs, the control section 210 may determine the order of the two PDSCHs.

In the case where presence of the TCI field is not configured, or in the case where presence of the TCI field is configured and any codepoint of the TCI field is not associated with two TCI state IDs, the control section 210 may use one TCI state in reception of the two PDSCHs.

(Hardware Configuration)

In addition, the block diagrams used in explanation of the above-mentioned Embodiments show blocks on a function-by-function basis. These function blocks (configuration sections) are actualized by any combination of at least one of hardware and software. Further, the method for actualizing each function block is not limited particularly. In other words, each function block may be actualized using a single apparatus combined physically or logically, or two or more apparatuses that are separated physically or logically are connected directly or indirectly (e.g., using cable, radio, etc.), and each function block may be actualized using a plurality of these apparatuses. The function block may be actualized by combining the above-mentioned one apparatus or the above-mentioned plurality of apparatuses and software.

Herein, the function includes judging, determining, deciding, calculating, computing, processing, deriving, investigating, searching, ascertaining, receiving, transmitting, outputting, accessing, resolving, selecting, choosing, establishing, comparing, assuming, expecting, considering, broadcasting, notifying, communicating, forwarding, configuring, reconfiguring, allocating, mapping, assigning and the like, but is not limited thereto. For example, the function block (configuration section) having the function of transmitting may be called a transmitting unit, transmitter and the like. In any case, as described above, the actualizing method is not limited particularly.

Figure 16:
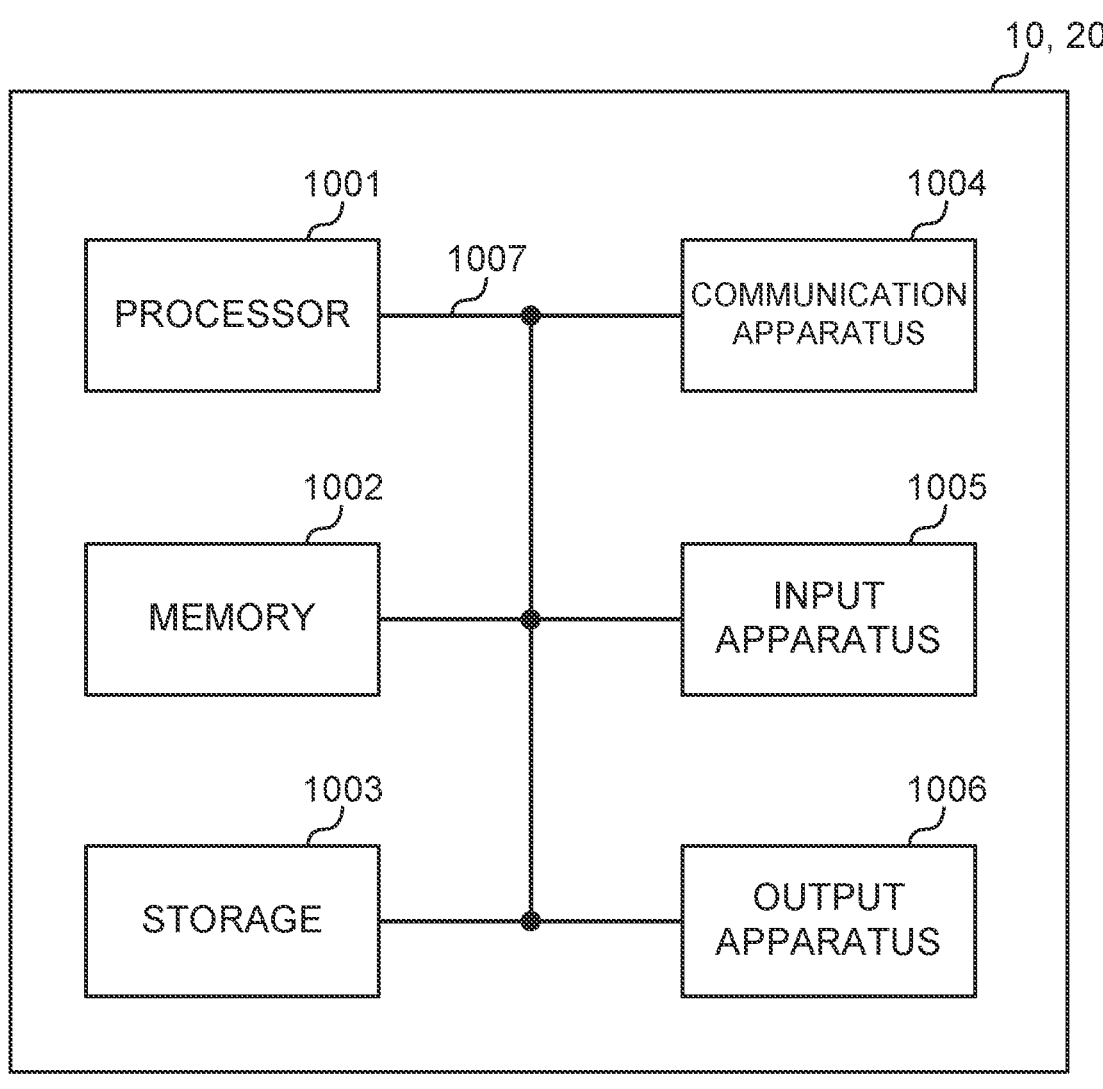
FIG. 16 is a diagram showing one example of hardware configurations of the base station and user terminal according to one Embodiment.

For example, each of the base station, user terminal and the like in one Embodiment of the present disclosure may function as a computer that performs the processing of the radio communication method of the disclosure. FIG. 16 is a diagram showing one example of a hardware configuration of each of the base station and user terminal according to one Embodiment. Each of the base station 10 and user terminal 20 as described above may be physically configured as a computer apparatus including a processor 1001, memory 1002, storage 1003, communication apparatus 1004, input apparatus 1005, output apparatus 1006, bus 1007 and the like.

In addition, in the present disclosure, it is possible to read the letter of apparatus, circuit, device, section, unit and the like with one another. With respect to each apparatus shown in the figure, the hardware configuration of each of the base station 10 and the user terminal 20 may be configured so as to include one or a plurality of apparatuses, or may be configured without including a part of apparatuses.

For example, a single processor 1001 is shown in the figure, but a plurality of processors may exist. Further, the processing may be executed by a single processor, or may be executed by two or more processors at the same time, sequentially or using another technique. In addition, the processor 1001 may be implemented on one or more chips.

For example, each function in the base station 10 and user terminal 20 is actualized in a manner such that predetermined software (program) is read on the hardware of the processor 1001, memory 1002 and the like, and that the processor 1001 thereby performs computations, and controls communication via the communication apparatus 1004, and at least one of read and write of data in the memory 1002 and storage 1003.

For example, the processor 1001 operates an operating system to control the entire computer. The processor 1001 may be comprised of a Central Processing Unit (CPU) interfaces including with peripheral apparatuses, control apparatus, computation apparatus, register and the like. For example, at least a part of the above-mentioned control section 110 (210), transmitting/receiving section 120 (220) and the like may be actualized by the processor 1001.

Further, the processor 1001 reads the program (program code), software module, data and the like on the memory 1002 from at least one of the storage 1003 and the communication apparatus 1004, and according thereto, executes various kinds of processing. Used as the program is a program that causes the computer to execute at least a part of operation described in the above-mentioned Embodiments. For example, the control section 110 (210) may be actualized by a control program stored in the memory 1002 to operate in the processor 1001, and the other function blocks may be actualized similarly.

The memory 1002 is a computer-readable storage medium, and for example, may be comprised of at least one of Read Only Memory (ROM), Erasable Programmable ROM (EPROM), Electrically EPROM (EEPROM), Random Access Memory (RAM) and other proper storage media. The memory 1002 may be called the register, cache, main memory (main storage apparatus) and the like. The memory 1002 is capable of storing the program (program code), software module and the like executable to implement the radio communication method according to one Embodiment of the present disclosure.

The storage 1003 is a computer-readable storage medium, and for example, may be comprised of at least one of a flexible disk, floppy (Registered Trademark) disk, magneto-optical disk (e.g., compact disk (Compact Disc ROM (CD-ROM), etc.), digital multi-purpose disk, Blu-ray (Registered Trademark) disk), removable disk, hard disk drive, smart card, flash memory device (e.g., card, stick, key drive), magnetic stripe, database, server and other proper storage media. The storage 1003 may be called an auxiliary storage apparatus.

The communication apparatus 1004 is hardware (transmitting/receiving device) to perform communication between computers via at least one of a wired network and a wireless network, and for example, is also referred to as a network device, network controller, network card, communication module and the like. For example, in order to actualize at least one of Frequency Division Duplex (FDD) and Time Division Duplex (TDD), the communication apparatus 1004 may be comprised by including a high-frequency switch, duplexer, filter, frequency synthesizer and the like. For example, the transmitting/receiving section 120 (220), transmitting/receiving antenna 130 (230) and the like as described above may be actualized by the communication apparatus 1004. The transmitting/receiving section 120 (220) may be made by physically or logically separated implementation using a transmitting section 120a (220a) and receiving section 120b (220b).

The input apparatus 1005 is an input device (e.g., keyboard, mouse, microphone, switch, button, sensor, etc.) that receives input from the outside. The output apparatus 1006 is an output device (e.g., display, speaker, Light Emitting Diode (LED) lamp, etc.) that performs output to the outside. In addition, the input apparatus 1005 and output apparatus 1006 may be an integrated configuration (e.g., touch panel).

Further, each apparatus of the processor 1001, memory 1002 and the like is connected on the bus 1007 to communicate information. The bus 1007 may be configured using a single bus, or may be configured using different buses between respective apparatuses.

Furthermore, each of the base station 10 and user terminal 20 may be configured by including hardware such as a microprocessor, Digital Signal Processor (DSP), Application Certain Integrated Circuit (ASIC), Programmable Logic Device (PLD), and Field Programmable Gate Array (FPGA), or a part or the whole of each function block may be actualized using the hardware. For example, the processor 1001 may be implemented using at least one of the hardware.

Modification

In addition, the term explained in the present disclosure and the term required to understand the present disclosure may be replaced with a term having the same or similar meaning. For example, the channel, symbol and signal (or signaling) may be read with one another. Further, the signal may be a message. The reference signal is capable of being abbreviated as RS, and according to the standard to apply, may be called a pilot, pilot signal and the like. Furthermore, the component carrier (CC) may be called a cell, frequency carrier, carrier frequency and the like.

A radio frame may be comprised of one or a plurality of frames in the time domain. The one or each of the plurality of frames constituting the radio frame may be called a subframe. Further, the subframe may be comprised of one or a plurality of slots in the time domain. The subframe may be a fixed time length (e.g., 1 ms) that is not dependent on numerology.

Herein, the numerology may be a communication parameter applied to at least one of transmission and reception of some signal or channel. For example, the numerology may indicate at least one of SubCarrier Spacing (SCS), bandwidth, symbol length, cyclic prefix length, Transmission Time Interval (TTI), the number of symbols per TTI, radio frame configuration, certain filtering processing performed by a transmitter/receiver in the frequency domain, certain windowing processing performed by a transmitter/receiver in the time domain and the like.

The slot may be comprised of one or a plurality of symbols (Orthogonal Frequency Division Multiplexing (OFDM) symbols, Single Carrier Frequency Division Multiple Access (SC-FDMA) symbols and the like) in the time domain. Further, the slot may a time unit based on numerology.

The slot may include a plurality of mini-slots. Each mini-slot may be comprised of one or a plurality of symbols in the time domain. Further, the mini-slot may be called a subslot. The mini-slot may be comprised of the number of symbols lower than the slot. A PDSCH (or PUSCH) transmitted in a time unit larger than the mini-slot may be called PDSCH (PUSCH) mapping type A. A PDSCH (or PUSCH) transmitted using the mini-slot may be called PDSCH (PUSCH) mapping type B.

Each of the radio frame, subframe, slot, mini-slot and symbol represents a time unit in transmitting a signal. For the radio frame, subframe, slot, mini-slot and symbol, another name corresponding to each of them may be used. In addition, the time units such as the frame, subframe, slot, mini-slot and symbol in the present disclosure may be read with one another.

For example, one subframe may be called TTI, a plurality of contiguous subframes may be called TTI, or one slot or one mini-slot may be called TTI. In other words, at least one of the subframe and TTI may be the subframe (1 ms) in existing LTE, may be a frame (e.g., 1 to 13 symbols) shorter than 1 ms, or may be a frame longer than 1 ms. In addition, instead of the subframe, the unit representing the TTI may be called the slot, mini-slot and the like.

Herein, for example, the TTI refers to a minimum time unit of scheduling in radio communication. For example, in the LTE system, the base station performs scheduling for allocating radio resources (frequency bandwidth, transmit power and the like capable of being used in each user terminal) to each user terminal in a TTI unit. In addition, the definition of the TTI is not limited thereto.

The TTI may be a transmission time unit of a data packet (transport block) subjected to channel coding, code block, codeword and the like, or may be a processing unit of scheduling, link adaptation and the like. In addition, when the TTI is given, a time segment (e.g., the number of symbols) to which the transport block, code block, codeword and the like are actually mapped may be shorter than the TTI.

In addition, when one slot or one mini-slot is called the TTI, one or more TTIs (i.e., one or more slots, or one or more mini-slots) may be the minimum time unit of sched-uling. Further, the number of slots (the number of mini-slots) constituting the minimum time unit of scheduling may be controlled.

The TTI having a time length of 1 ms may be called ordinary TTI (TTI in 3GPP LTE Rel. 8-12), normal TTI, long TTI, ordinary subframe, normal subframe, long subframe, slot and the like. The TTI shorter than the ordinary TTI may be called shortened TTI, short TTI, partial or fractional TTI, shortened subframe, short subframe, mini-slot, subslot, slot and the like.

In addition, the long TTI (e.g., ordinary TTI, subframe, etc.) may be read with TTI having a time length exceeding 1 ms, and the short TTI (e.g., shortened TTI, etc.) may be read with TTI having a TTI length of 1 ms or more and less than the TTI length of the long TTI.

The resource block (RB) is a resource allocation unit in the time domain and frequency domain, and may include one or a plurality of contiguous subcarriers in the frequency domain. The number of subcarriers contained in the RB may be the same irrespective of the numerology, and for example, may be "12". The number of subcarriers contained in the RB may be determined based on the numerology.

Further, the RB may include one or a plurality of symbols in the time domain, and may be a length of 1 slot, 1 mini-slot, 1 subcarrier, or 1 TTI. Each of 1 TTI, 1 subframe and the like may be comprised of one or a plurality of resource blocks.

In addition, one or a plurality of RBs may be called a physical resource block (Physical RB subcarrier group (Sub-Carrier Group (SCG)), Resource Element Group (REG), PRB pair, RB pair and the like.

Further, the resource block may be comprised of one or a plurality of resource elements (Resource Element (RE)). For example, 1 RE may be a radio resource region of 1 subcarrier and 1 symbol.

A Bandwidth Part (BWP) (which may be called a partial bandwidth, etc.) may represent a subset of contiguous common RBs (common resource blocks) for some numerology in some carrier. Herein, the common RB may be identified by an index of the RB with a common reference point of the carrier as reference. The PRB may be defined by some BWP, and may be numbered within the BWP.

The BWP may include UL BWP (BWP for UL) and DL BWP (BWP for DL). For a UE, one or a plurality of BWPs may be configured within one carrier.

At least one of configured BWPs may be active, and the UE may not assume that a predetermined signal/channel is transmitted and received outside the active BWP. In addition, the "cell", "carrier" and the like in the present disclosure may be read with the "BWP".

In addition, structures of the above-mentioned radio frame, subframe, slot, mini-slot, symbol and the like are only illustrative. For example, it is possible to modify, in various manners, configurations of the number of subframes included in the radio frame, the number of slots per subframe or radio frame, the number of mini-slots included in the slot, the numbers of symbols and RBs included in the slot or mini-slot, the number of subcarriers included in the RB, the number of symbols within the TTI, the symbol length, the cyclic prefix (CP) length and the like.

Further, the information, parameter and the like explained in the present disclosure may be expressed using an absolute value, may be expressed using a relative value from a predetermined value, or may be expressed using another corresponding information. For example, the radio resource may be indicated by a predetermined index.

The names used in the parameter and the like in the present disclosure are not restrictive names in any respects. Further, equations and the like using these parameters may be different from those explicitly disclosed in the disclosure. It is possible to identify various channels (PUCCH, PDCCH, etc.) and information elements, by any suitable names, and therefore, various names assigned to these various channels and information elements are not restrictive names in any respects.

The information, signal and the like explained in the present disclosure may be represented by using any of various different techniques. For example, the data, order, command, information, signal, bit, symbol, chip and the like capable of being described over the entire above-mentioned explanation may be represented by voltage, current, electromagnetic wave, magnetic field or magnetic particle, optical field or photon, or any combination thereof.

Further, the information, signal and the like are capable of being output at least one of from a higher layer to a lower layer, and from the lower layer to the higher layer. The information, signal and the like may be input and output via a plurality of network nodes.

The input/output information, signal and the like may be stored in a certain place (e.g., memory), or may be managed using a management table. The input/output information, signal and the like are capable of being rewritten, updated or edited. The output information, signal and the like may be deleted. The input information, signal and the like may be transmitted to another apparatus.

Notification of the information is not limited to the Aspects/Embodiments described in the present disclosure, and may be performed using another method. For example, notification of the information in the disclosure may be performed using physical layer signaling (e.g., Downlink Control Information (DCI), Uplink Control Information (UCI)), higher layer signaling (e.g., Radio Resource Control (RRC) signaling, broadcast information (Master Information Block (MIB)), System Information Block (SIB) and the like), Medium Access Control (MAC) signaling), other signals, for combination thereof.

In addition, the physical layer signaling may be called Layer 1/Layer 2 (L1/L2) control information (L1/L2 control signal), L1 control information (L1 control signal) and the like. Further, the RRC signaling may be called RRC message, and for example, may be RRC connection setup (RRC Connection Setup) message, RRC connection reconfiguration (RRC Connection Reconfiguration) message, and the like. Furthermore, for example, the MAC signaling may be notified using MAC Control Element (MAC CE).

Further, notification of predetermined information (e.g., notification of "being X") is not limited to explicit notification, and may be performed implicitly (e.g., notification of the predetermined information is not performed, or by notification of different information).

The decision may be made with a value ("0" or "1") expressed by 1 bit, may be made with a Boolean value represented by true or false, or may be made by comparison with a numerical value (e.g., comparison with a predetermined value).

Irrespective of that the software is called software, firmware, middle-ware, micro-code, hardware descriptive term, or another name, the software should be interpreted widely to mean a command, command set, code, code segment, program code, program, sub-program, software module, application, software application, software package, routine, sub-routine, object, executable file, execution thread, procedure, function and the like.

Further, the software, command, information and the like may be transmitted and received via a transmission medium. For example, when the software is transmitted from a website, server or another remote source using at least one of wired techniques (coaxial cable, optical fiber cable, twisted pair, Digital Subscriber Line (DSL) and the like) and wireless techniques (infrared, microwave and the like), at least one of the wired technique and the wireless technique is included in the definition of the transmission medium.

The terms of "system" and "network" used in the present disclosure are capable of being used interchangeably. A "network" may mean an apparatus (e.g., base station) included in the network.

In the present disclosure, the terms of "precoding", "precoder", "weight (precoding weight)", "Quasi-Co-Location (QCL)", "Transmission Configuration Indication state (TCI state)", "spatial relation", "spatial domain filter", "transmit power", "phase rotation", "antenna port", "antenna port group", "layer", "the number of layers", "rank", "resource", "resource set", "resource group", "beam", "beam width", "beam angle", "antenna", "antenna element", "panel" and the like are capable of being used interchangeably.

In the present disclosure, the terms of "Base Station (BS)", "radio base station", "fixed station", "NodeB", "eNB (eNodeB)", "gNB (gNodeB)", "access point", "Transmission Point (TP)", "Reception Point (RP)", "Transmission/Reception Point (TRP)", "panel", "cell", "sector", "cell group", "carrier", "component carrier" and the like are capable of being used interchangeably. There is the case where the base station is called by the terms of macrocell, small cell, femto-cell, pico-cell and the like.

The base station is capable of accommodating one or a plurality of (e.g., three) cells. When the base station accommodates a plurality of cells, the entire coverage area of the base station is capable of being segmented into a plurality of smaller areas, and each of the smaller areas is also capable of providing communication services by a base station sub-system (e.g., small base station (Remote Radio Head (RRH)) for indoor use). The term of "cell" or "sector" refers to a part or the whole of coverage area of at least one of the base station and the base station sub-system that perform communication services in the coverage.

In the present disclosure, the terms of "Mobile Station (MS)", "user terminal", "User Equipment (UE)", "terminal" and the like are capable of being used interchangeably.

There is the case where the Mobile Station may be called using a subscriber station, mobile unit, subscriber unit, wireless unit, remote unit, mobile device, wireless device, wireless communication device, remote device, mobile subscriber station, access terminal, mobile terminal, wireless terminal, remote terminal, handset, user agent, mobile client, client, or some other suitable terms.

At least one of the base station and the mobile station may be called a transmitting apparatus, receiving apparatus, radio communication apparatus and the like. In addition, at least one of the base station and the mobile station may be a device installed in a moving object, moving object itself and the like. The moving object may be a vehicle (e.g., car, airplane, etc.), may be a moving object (e.g., drone, self-driving car, etc.) moving without human intervention, or may be a robot (crewed type or uncrewed type). In addition, at least one of the base station and the mobile station includes an apparatus that does always not move at the time of communication operation. For example, at least one of the base station and the mobile station may be an Internet of Things (IoT) device such as a sensor.

Further, the base station in the present disclosure may be read with the user terminal. For example, each Aspect/Embodiment of the disclosure may be applied to a configuration where communication between the base station and the user terminal is replaced with communication among a plurality of user terminals (for example, which may be called Device-to-Device (D2D), Vehicle-to-Everything (V2X), etc.). In this case, the functions that the above-mentioned base station 10 has may be the configuration that the user terminal 20 has. Further, the words of "up", "down" and the like may be read with a word (e.g., "side") that corresponds to Device-to-Device communication. For example, the uplink channel, downlink channel and the like may be read with a side channel.

Similarly, the user terminal in the present disclosure may be read with the base station. In this case, the functions that the above-mentioned user terminal 20 has may be the configuration that the base station 10 has.

In the present disclosure, operation performed by the base station may be performed by an upper node thereof in some case. In a network including one or a plurality of network nodes having the base station, it is obvious that various operations performed for communication with the terminal are capable of being performed by the base station, one or more network nodes (e.g., Mobility Management Entity (MME), Serving-Gateway (S-GW) and the like are considered, but the disclosure is not limited thereto) except the base station, or combination thereof.

Each Aspect/Embodiment explained in the present disclosure may be used alone, may be used in combination, or may be switched and used according to execution. Further, with respect to the processing procedure, sequence, flowchart and the like of each Aspect/Embodiment explained in the disclosure, unless there is a contradiction, the order may be changed. For example, with respect to the methods explained in the disclosure, elements of various steps are presented in illustrative order, and are not limited to the presented certain order.

Each Aspect/Embodiment explained in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), Future Radio Access (FRA), New-Radio Access Technology (RAT), New Radio (NR), New radio access (NX), Future generation radio access (FX), Global System for Mobile communications (GSM (Registered Trademark)), CDMA 2000, Ultra Mobile Broadband (UMB), IEEE 802.11 (Wi-Fi (Registered Trademark)), IEEE 802.16 (WiMAX (Registered Trademark)), IEEE 802.20, Ultra-WideBand (UWB), Bluetooth (Registered Trademark), system using another proper radio communication method, the next-generation system extended based thereon and the like. Further, a plurality of systems may be combined (e.g., combination of LTE or LTE-A and 5G, etc.) to apply.

The description of "based on" used in the present disclosure does not mean "based on only", unless otherwise specified. In other words, the description of "based on" means both of "based on only" and "based on at least".

Any references to elements using designations of "first", "second" and the like used in the present disclosure do not limit the amount or order of these elements overall. These designations are capable of being used in the disclosure as the useful method to distinguish between two or more elements. Accordingly, references of first and second elements do not mean that only two elements are capable of being adopted, or that the first element should be prior to the second element in any manner.

There is the case where the term of "determining" used in the present disclosure includes various types of operation. For example, "determining" may be regarded as "determining" judging, calculating, computing, processing, deriving, investigating, looking up (search, inquiry) (e.g., looking up in a table, database or another data structure), ascertaining and the like.

Further, "determining" may be regarded as "determining" receiving (e.g., receiving information), transmitting (e.g., transmitting information), input, output, accessing (e.g., accessing data in memory) and the like.

Furthermore, "determining" may be regarded as "determining" resolving, selecting, choosing, establishing, comparing and the like. In other words, "determining" may be regarded as "determining" some operation.

Still furthermore, "determining" may be read with "assuming", "expecting", "considering" and the like.

The terms of "connected" and "coupled" used in the present disclosure or any modifications thereof mean direct or indirect every connection or coupling among two or more elements, and are capable of including existence of one or more intermediate elements between two mutually "connected" or "coupled" elements. Coupling or connection between elements may be physical, may be logical or may be combination thereof. For example, "connection" may be read with "access".

In the present disclosure, in the case where two elements are connected, it is possible to consider that two elements are mutually "connected" or "coupled", by using one or more electric wires, cable, print electric connection, etc. and as some non-limited and non-inclusive examples, electromagnetic energy having wavelengths in a radio frequency region, microwave region and light (both visible and invisible) region, or the like.

In the present disclosure, the term of "A and B are different" may mean that "A and B are different from each other". In addition, the term may mean that "each of A and B is different from C". The terms of "separate", "coupled" and the like may be interpreted in the same manner as "different".

In the case of using "include", "including", and modifications thereof in the present disclosure, as in the term of "comprising", these terms are intended to be inclusive. Further, the term of "or" used in the disclosure is intended to be not exclusive OR.

In the present disclosure, in the case where articles are added by translation, for example, as "a", "an" and "the" in English, the disclosure may include that nouns continued from these articles are in the plural.

As described above, the invention according to the present disclosure is described in detail, but it is obvious to a person skilled in the art that the invention according to the disclosure is not limited to the Embodiments described in the disclosure. The invention according to the disclosure is capable of being carried into practice as modified and changed aspects without departing from the subject matter and scope of the invention defined by the descriptions of the scope of the claims. Accordingly, the descriptions of the disclosure are intended for illustrative explanation, and do not provide the invention according to the disclosure with any restrictive meaning.

The invention claimed is:

1. A terminal comprising:

a receiver that receives single downlink control information (DCI) for scheduling physical downlink shared channels (PDSCHs) transmitted from two transmission/reception points (TRPs); and a processor that, when transmission configuration indication (TCI) field-present information is not configured, a time offset between reception of the DCI and reception of the PDSCH is less than a threshold, and at least one codepoint associated with two TCI states is configured, determines, as a quasi-co-location (QCL) parameter for the PDSCH, two TCI states associated with a lowest codepoint of the at least one codepoint, wherein the PDSCHs transmitted from the two TRPs are allocated to a non-overlapping time domain within a single slot.

2. The terminal according to claim 1, further comprising a transmitter that transmits the threshold as capability information.

3. The terminal according to claim 2, wherein when the TCI field-present information is not configured and a time offset between reception of the DCI and reception of the PDSCH is equal to or greater than the threshold, the processor assumes that a TCI state or QCL assumption applied for the PDSCH is identical to a TCI state or QCL assumption applied for transmission of the DCI.

4. The terminal according to claim 2, wherein when the TCI field-present information is configured and a time offset between reception of the DCI and reception of the PDSCH is equal to or greater than the threshold, the processor determines, as a QCL parameter for the PDSCH, a TCI state indicated by the DCI.

5. The terminal according to claim 1, wherein when the TCI field-present information is not configured and a time offset between reception of the DCI and reception of the PDSCH is equal to or greater than the threshold, the processor assumes that a TCI state or QCL assumption applied for the PDSCH is identical to a TCI state or QCL assumption applied for transmission of the DCI.

6. The terminal according to claim 5, wherein when the TCI field-present information is configured and a time offset between reception of the DCI and reception of the PDSCH is equal to or greater than the threshold, the processor determines, as a QCL parameter for the PDSCH, a TCI state indicated by the DCI.

7. The terminal according to claim 1, wherein when the TCI field-present information is configured and a time offset between reception of the DCI and reception of the PDSCH is equal to or greater than the threshold, the processor determines, as a QCL parameter for the PDSCH, a TCI state indicated by the DCI.

8. A radio communication method for a terminal, comprising:

receiving downlink control information (DCI) for scheduling physical downlink shared channels (PDSCHs) transmitted from two transmission/reception points (TRPs); and when transmission configuration indication (TCI) field-present information is not configured, a time offset between reception of the DCI and reception of the PDSCH is less than a threshold, and at least one codepoint associated with two TCI states is configured, determining, as a quasi-co-location (QCL) parameter for the PDSCH, two TCI states associated with a lowest codepoint of the at least one codepoint, wherein the PDSCHs transmitted from the two TRPs are allocated to a non-overlapping time domain within a single slot.

9. A system comprising a terminal and a base station, wherein the terminal comprises:

a receiver that receives downlink control information (DCI) for scheduling physical downlink shared channels (PDSCHs) transmitted from two transmission/reception points (TRPs); and a processor that, when transmission configuration indication (TCI) field-present information is not configured, a time offset between reception of the DCI and reception of the PDSCH is less than a threshold, and at least one codepoint associated with two TCI states is configured, determines, as a quasi-co-location (QCL) parameter for the PDSCH, two TCI states associated with a lowest codepoint of the at least one codepoint, and the base station comprises:

a transmitter that transmits the DCI, wherein the PDSCHs transmitted from the two TRPs are allocated to a non-overlapping time domain within a single slot.

* * * * *